US012586698B2

(12) United States Patent
Casey et al.

(10) Patent No.: US 12,586,698 B2
(45) Date of Patent: Mar. 24, 2026

(54) DEVICES AND METHODS RELATED TO MOV HAVING MODIFIED EDGE

(71) Applicant: Bourns, Inc., Riverside, CA (US)

(72) Inventors: Kelly C. Casey, Corinth, TX (US); Oscar Ulloa Esquivel, Heredia (CR); Gordon L. Bourns, Riverside, CA (US); Fernando Estrada Hernandez, San Jose (CR); Che-Yi Su, Zuzemberk (SI)

( * ) Notice: Subject to any disclaimer, the term of this patent is extended or adjusted under 35 U.S.C. 154(b) by 186 days.

(21) Appl. No.: 17/892,345

(22) Filed: Aug. 22, 2022

(65) Prior Publication Data

US 2023/0178273 A1 Jun. 8, 2023

Related U.S. Application Data

(63) Continuation of application No. PCT/US2021/020116, filed on Feb. 26, 2021.

(60) Provisional application No. 62/982,542, filed on Feb. 27, 2020, provisional application No. 62/982,220, filed on Feb. 27, 2020.

(51) Int. Cl.
*H01C 7/108* (2006.01)
*H01C 7/102* (2006.01)

(52) U.S. Cl.
CPC ............. *H01C 7/108* (2013.01); *H01C 7/102* (2013.01)

(58) Field of Classification Search
CPC ................................ H01C 7/108; H01C 7/102
See application file for complete search history.

(56) References Cited

U.S. PATENT DOCUMENTS 3,987,343 A * 10/1976 Cunningham ............ H01T 4/06 315/36
4,360,757 A 11/1982 Hahndorff
4,527,215 A * 7/1985 Wessing .................... H01T 1/14 361/120
11,043,317 B2 * 6/2021 Shu .......................... H01C 1/14
2006/0091807 A1 5/2006 Bertin-Mourot
(Continued)

FOREIGN PATENT DOCUMENTS

CN 103681173 A 3/2014
CN 206432095 U 8/2017
(Continued)

OTHER PUBLICATIONS

JP2000058307 machine translation (Year: 2000).*
(Continued)

*Primary Examiner* — Kyung S Lee
(74) *Attorney, Agent, or Firm* — Chang & Hale LLP

(57) ABSTRACT

Devices and methods related to metal oxide varistor (MOV) having modified edge. In some embodiments, a MOV can include a metal oxide layer having first side and second sides, first and second electrodes implemented on the first and second sides of the metal oxide layer, respectively, with each electrode including a laterally inner portion and an edge portion. The edge portion of at least the first electrode can have a flared profile. In some embodiments, two of such MOVs can be joined to provide a sealed chamber defined by shapes of the first sides of the respective metal oxide layers and enclosing a gas therein, such that the sealed chamber with the gas and the first electrodes of the two MOVs form a gas discharge tube (GDT).

20 Claims, 29 Drawing Sheets

(56) References Cited

U.S. PATENT DOCUMENTS

| | | | |
|---|---|---|---|
| 2008/0143243 | A1 | 6/2008 | Auday et al. |
| 2010/0253207 | A1 | 10/2010 | Joulaud |
| 2012/0236450 | A1 | 9/2012 | Adachi |
| 2014/0184064 | A1 | 7/2014 | Chang |
| 2014/0239804 | A1 | 8/2014 | Kelly et al. |
| 2016/0087409 | A1 | 3/2016 | Kelly et al. |
| 2016/0276146 | A1 | 9/2016 | Heath et al. |
| 2019/0074162 | A1 | 3/2019 | Wang et al. |

FOREIGN PATENT DOCUMENTS

| | | | | | |
|---|---|---|---|---|---|
| CN | 106782953 | B | * | 9/2018 | ............ H01C 17/00 |
| CN | 109256247 | A | | 1/2019 | |
| CN | 110301079 | A | | 10/2019 | |
| CN | 209691503 | U | | 11/2019 | |
| CN | 202180022129.0 | | | 9/2022 | |
| EP | 0893863 | A1 | | 7/1999 | |
| EP | 0969481 | A1 | | 1/2000 | |
| EP | 21760876.9 | | | 8/2022 | |
| JP | H11-126674 | A | | 5/1999 | |
| JP | 2000058307 | A | * | 2/2000 | |
| JP | 2002-151008 | A | | 5/2002 | |
| JP | 2012-212535 | A | | 11/2012 | |
| JP | 2016-515282 | A | | 5/2016 | |
| JP | 2018-512709 | A | | 5/2018 | |
| JP | 2022-551607 | | | 8/2022 | |
| KR | 10-0817485 | B1 | | 3/2008 | |
| KR | 10-2022-7032919 | | | 9/2022 | |

OTHER PUBLICATIONS

CN106782953 machine translation (Year: 2018).*

International Search Report dated Jun. 24, 2021 for PCT/US2021/020116.

Written Opinion dated Jun. 24, 2021 for PCT/US2021/020116.

* cited by examiner

DEVICES AND METHODS RELATED TO MOV HAVING MODIFIED EDGE

CROSS-REFERENCE TO RELATED APPLICATION(S)

This application is a continuation of International Application No. PCT/US2021/020116 filed Feb. 26, 2021, entitled DEVICES AND METHODS RELATED TO MOV HAVING MODIFIED EDGE, which claims priority to U.S. Provisional Application Nos. 62/982,220 filed Feb. 27, 2020, entitled MOV WITH MODIFIED EDGE CONFIGURATION, and 62/982,542 filed Feb. 27, 2020, entitled INTEGRATED DEVICE HAVING GDT AND MOV WITH MODIFIED EDGE, the benefits of the filing dates of which are hereby claimed and the disclosures of which are hereby expressly incorporated by reference herein in their entirety.

BACKGROUND

Field

The present disclosure relates to devices and methods related to metal oxide varistor (MOV) having modified edge.

Description of the Related Art

A metal oxide varistor (MOV) typically includes a layer of metal oxide material, such as zinc oxide, implemented between two electrodes. Under normal condition (e.g., at or below a rated voltage between the electrodes), the MOV is non-conducting, but becomes conducting when the voltage exceeds the rated voltage.

In electrical applications, the foregoing MOV can be implemented in a circuit by itself, or in combination with another electrical device such as a gas discharge tube (GDT), which is a device having a gas between two electrodes in a sealed chamber. When a triggering condition such as a high voltage spike arises between the electrodes, the gas ionizes and conducts electricity between the electrodes.

SUMMARY

In some implementations, the present disclosure relates to an electrical device that includes a metal oxide layer having first and second sides, and first and second electrodes implemented on the first and second sides of the metal oxide layer, respectively. Each electrode includes a laterally inner portion and an edge portion, with the edge portion of the first electrode having a flared profile.

In some embodiments, the electrical device can be configured as a metal oxide varistor (MOV).

In some embodiments, the flared profile can be configured to provide a desired end effect at or near an edge of at least the first electrode when a potential difference exists between the first and second electrodes. The desired end effect can include a reduction in the end effect. The end effect can include a temperature, an electric field strength, or a surface charge density.

In some embodiments, the edge portion of the second electrode can also include a flared profile. In some embodiments, first electrode can be an approximate mirror image of the second electrode with respect to a mid-plane between the first and second electrodes.

In some embodiments, the edge portion of each of the first and second electrodes can include a straight section that extends from the respective inner portion at an angle to provide the flared profile when viewed in a side sectional view. The straight section of the edge portion of each electrode can be dimensioned and oriented with respect to the inner portion so as to extend outward laterally by an amount a3 and away from the other electrode by an amount a2.

In some embodiments, the quantity a3 can have a value in a range between 0.02×D and 0.3×D, or in a range between 0.02×D and 0.03×D, where D is an overall dimension of the MOV. In some embodiments, the quantity a3 can have a value of approximately 0.025×D. In some embodiments, the quantity a3 can have a value in a range between 0.02×D and 0.4×D, or in a range between 0.05×D and 0.20×D, where D is an overall dimension of the MOV. In some embodiments, the quantity a3 can have a value of approximately 0.14×D, approximately 0.10×D, or approximately 0.08×D. In some embodiments, the MOV can have a disk shape with an overall diameter, such that the overall dimension D is approximately equal to the overall diameter.

In some embodiments, the quantity a2 can have a value in a range between 0.05×a1 and 0.25×a1, or in a range between 0.08×a1 and 0.21×a1, where a1 is a center separation distance between the laterally inner portion of the first and second electrodes. In some embodiments, the quantity a2 can have a value of approximately 0.2×a1.

In some embodiments, the edge portion of each of the first and second electrodes can further include another straight section that extends from the straight section at another angle that is different than the angle.

In some embodiments, the edge portion of each of the first and second electrodes can include a curve that extends from the respective inner portion to provide the flared profile when viewed in a side sectional view. The curve can include a portion of, for example, a conic section curve or an exponential curve. In some embodiments, the curve can include a portion of a circle such that the curve has a radius of curvature of R. For example, the quantity R can have a value in a range between 0.5×a1 and 0.8×a1, where a1 is a center separation distance between the laterally inner portion of the first and second electrodes.

In some embodiments, the second electrode can be substantially planar such that its edge portion is co-planar with the inner portion.

In some embodiments, the first side of the metal oxide layer can be dimensioned to accommodate the first electrode, and the second side of the metal oxide layer can be dimensioned to accommodate the second electrode. The first side of the metal oxide layer can define a shaped depression to accommodate the flared profile of the edge portion of the first electrode.

In some embodiments, the metal oxide layer can have a circular shape when viewed from either of its first side and second side. In some embodiments, each of the first and second electrodes can have a circular shape when viewed from either of the first side and second side of the metal oxide layer.

In some embodiments, the metal oxide layer can have a rectangular shape when viewed from either of its first side and second side. In some embodiments, each of the first and second electrodes can have a circular shape or a rectangular shape when viewed from either of the first side and second side of the metal oxide layer.

In some embodiments, the metal oxide layer with the first and second electrodes can form a first metal oxide varistor (MOV). In some embodiments, the electrical device can further include a second MOV coupled to the first MOV with an electrically insulating seal. The second MOV can include a metal oxide layer having first and second sides, and first and second electrodes implemented on the first and second sides of the metal oxide layer, respectively. Each electrode can include a laterally inner portion and an edge portion, with the edge portion of the first electrode having a flared profile. The first and second MOVs can be oriented so that their first sides face each other to define a sealed chamber with the electrically insulating seal and enclosing a gas therein, such that the sealed chamber with the gas and the first electrodes of the first and second MOVs form a gas discharge tube (GDT).

In some embodiments, the electrical device can form an electrically series arrangement of the first MOV, the GDT and the second MOV, such that the first electrode of the first MOV is also one of the two electrodes of the GDT and the first electrode of the second MOV is also the other of the two electrodes of the GDT, and such that the second electrodes of the first and second MOVs are external electrodes of the electrical device. In some embodiments, the electrically insulating seal can include a glass seal.

In some embodiments, the electrically insulating seal can be dimensioned to extend laterally inward and cover some or all of the edge portion of the first electrode of each of the first and second MOVs to thereby increase a leakage path length between the first electrodes.

In some embodiments, the metal oxide layer of each of the first and second MOVs can include a side wall and an outer edge that joins the side wall and the first side of the respective MOV. The outer edge can include an edge profile dimensioned to provide a space to accommodate at least some of an excess material associated with the electrically insulating seal. The edge profile can be dimensioned such that the excess material associated with the electrically insulating seal does not extend outward beyond the side wall of the respective metal oxide layer.

In some implementations, the present disclosure relates to a method for fabricating a metal oxide varistor device. The method includes forming or providing a metal oxide layer having first and second sides, and implementing first and second electrodes on the first and second sides of the metal oxide layer. Each electrode includes a laterally inner portion and an edge portion, with the edge portion of the first electrode having a flared profile.

In some embodiments, the implementing of the second electrode can result in the second electrode being substantially planar such that its edge portion is co-planar with the inner portion. In some embodiments, the implementing of the second electrode can result in the edge portion of the second electrode having a flared profile.

In some embodiments, the metal oxide layer can be a unit among a plurality of similar units joined together in an array. In some embodiments, the method can further include singulating the plurality of units into a plurality of individual units.

According to some implementations, the present disclosure relates to an electrical device that includes a first metal oxide varistor (MOV) including a first metal oxide layer with an external side and an internal side with a first shaped depression, a first external electrode on the external side of the first metal oxide layer, and a first internal electrode covering some or all of the first shaped depression, with the first internal electrode having an edge portion that flares away from the first external electrode. The electrical device further includes a second MOV including a second metal oxide layer with an external side and an internal side with a second shaped depression, a second external electrode on the external side of the second metal oxide layer, and a second internal electrode covering some or all of the second shaped depression, with the second internal electrode having an edge portion that flares away from the second external electrode. The electrical device further includes a seal implemented between the internal side of the first metal oxide layer and the internal side of the second metal oxide layer to provide a sealed chamber defined by the first and second shaped depressions and enclosing a gas therein, such that the sealed chamber with the gas and the first and second internal electrodes form a gas discharge tube (GDT).

In some embodiments, the seal can be formed from an electrically insulating material such as glass. In some embodiments, the electrically insulating seal can be dimensioned to be at least between an outer end of the edge portion of the first internal electrode and an outer end of the edge portion of the second internal electrode. In some embodiments, the electrically insulating material can have a dielectric strength that is greater than a dielectric strength of the gas present in the sealed chamber to reduce the likelihood of dielectric breakdown between the ends of the edge portions. In some embodiments, the electrically insulating seal can be further dimensioned to extend laterally inward and cover some or all of the edge portion of each of the first and second internal electrodes to thereby increase a leakage path length between the first and second internal electrodes.

In some embodiments, the seal can include a spacer and a first layer of an electrically insulating material that joins one side of the spacer to the internal side of the first metal oxide layer and a second layer of the electrically insulating material that joins the other side of the spacer to the internal side of the second metal oxide layer. The electrically insulating material can include glass. The spacer can have a washer shape with an outer lateral dimension similar to an outer lateral dimension of each metal oxide layer. The spacer can be formed from an electrically conducting material or an electrically insulating material.

In some embodiments, the first MOV can be an approximate mirror image of the second MOV with respect to a mid-plane between the first and second MOVs. In some embodiments, the edge portion of each internal electrode can include one or more straight sections, with each straight section extending laterally outward at an angle to provide the flared profile when viewed in a side sectional view. In some embodiments, the edge portion of each internal electrode can include a curve that extends laterally outward to provide the flared profile when viewed in a side sectional view. In some embodiments, the curve can include a portion of a conic section curve or an exponential curve. For example, the curve can include a portion of a circle such that the curve has a radius of curvature of R.

In some embodiments, the electrical device can further include an emissive coating formed over each internal electrode.

In some embodiments, each of the first and second metal oxide layers can include a side wall, such that the side walls of first and second metal oxide layers define a side wall of the electrical device. In some embodiments, the first and second metal oxide layers can have approximately same lateral dimension such that the side walls of the first and second metal oxide layers are approximately colinear.

In some embodiments, the electrical device can further include a passivation jacket implemented on the side wall of each of the first and second metal oxide layers, with the passivation jacket being configured to prevent or reduce a likelihood of outside arcing.

In some embodiments, each of the first and second metal oxide layers can include an outer edge on the respective internal side. In some embodiments, the outer edge of each of the first and second metal oxide layers can have an approximately right-angle shape.

In some embodiments, the outer edge of each of either or both of the first and second metal oxide layers can include an edge profile dimensioned to provide a space to accommodate at least some of an excess material associated with the seal. In some embodiments, the edge profile of each of either or both of the first and second metal oxide layers can be dimensioned such that the excess material associated with the seal does not extend outward beyond the side wall of the respective metal oxide layer.

In some embodiments, the edge profile can include a chamfer edge profile or a groove edge profile. For example, the groove edge profile can include a curve groove edge or a groove edge having a plurality of straight segments.

In some embodiments, the outer edge of only one of the first and second metal oxide layers can include the respective edge profile. In some embodiments, the outer edge of each of both of the first and second metal oxide layers can include the respective edge profile.

In some embodiments, the edge profile of the first metal oxide layer can be an approximate mirror image of the edge profile of the second metal oxide layer with respect to a mid-plane between the first and second metal oxide layers. In some embodiments, the edge profile of the first metal oxide layer can be different than the edge profile of the second metal oxide layer in dimension and/or shape.

According to some implementations, the present disclosure relates to a method for fabricating an electrical device. The method includes forming or providing first and second metal oxide layers with each having an external side and an internal side with a shaped depression. The method further includes forming an internal electrode to cover some or all of the shaped depression of each of the first and second metal oxide layers, with the internal electrode having an edge portion that flares away from the respective external side. The method further includes joining the internal side of the first metal oxide layer and the internal side of the second metal oxide layer to form a sealed chamber defined by the first and second shaped depressions and enclosing a gas therein, such that the sealed chamber with the gas and the internal electrodes of the first and second metal oxide layers form a gas discharge tube (GDT). The method further includes forming an external electrode on the external side of each of the first and second metal oxide layers, such that the first metal oxide layer and the respective external and internal electrodes form a first metal oxide varistor (MOV) on a first side of the GDT, and the second metal oxide layer and the respective external and internal electrodes form a second MOV on a second side of the GDT.

In some embodiments, the joining can include forming a seal with an electrically insulating material such as glass. In some embodiments, the forming of the seal can result in the electrically insulating material extending laterally inward to cover some or all of the edge portion of each of the internal electrodes.

In some embodiments, the method can further include forming an emissive coating over each internal electrode.

In some embodiments, the forming or providing of the first and second metal oxide layers can include forming or providing a side wall for each of the first and second metal oxide layers, such that the side wall and the internal side of the respective metal oxide layer forms an outer edge. In some embodiments, the method can further include forming a passivation jacket on the side wall of each of the first and second metal oxide layers.

In some embodiments, the forming or providing the side wall can include forming or providing an approximately right-angle shape for the respective outer edge. In some embodiments, the forming or providing the side wall can include forming or providing an edge profile for the respective outer edge, with the edge profile being dimensioned to provide a space to accommodate at least some of an excess material resulting from the joining the internal side of the first metal oxide layer and the internal side of the second metal oxide layer.

In some embodiments, an assembly of the first MOV, the GDT and the second MOV can be a unit among a plurality of similar units joined together in an array. In some embodiments, the method can further include singulating the plurality of units into a plurality of individual units.

In some implementations, the present disclosure relates to a metal oxide varistor (MOV) that includes a metal oxide layer having a first side and a second side, and first and second electrodes implemented on the first and second sides of the metal oxide layer, respectively. Each electrode includes a laterally inner portion and an edge portion, with at least one of the first and second electrodes being configured such that a parameter associated with the MOV at an edge of the edge portion of the respective electrode has a magnitude that is within a selected range of a magnitude of the parameter at a center of the electrode.

In some embodiments, the parameter can include a temperature, an electric field strength, or a surface charge density. In some embodiments, the selected range includes ±50%, ±40%, ±30%, ±20% or ±10% of the magnitude of the parameter at the center of the electrode.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Disclosed herein are various examples of devices and methods related to metal oxide varistors (MOVs). It is noted that MOV devices are popular overvoltage protection devices. Notable features of such MOVs include a working voltage rating and a surge current rating. In many implementations, MOVs are configured as disk shaped devices with radial leads. The thickness of such a disk typically corresponds to the MOV device's voltage rating, and the diameter of the disk is roughly proportional to the surge current rating.

Figure 1:
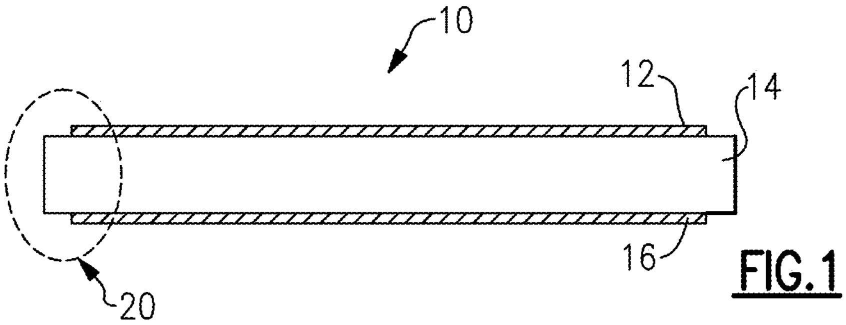
FIG. 1 shows a side sectional view of a conventional metal oxide varistor (MOV) having a metal oxide layer with first and second electrodes implemented on first and second sides of the metal oxide layer.

FIG. 1 shows a side sectional view of a conventional MOV 10 having a metal oxide layer 14 (e.g., in a disk shape) with first and second electrodes 12, 16 implemented on first and second sides of the metal oxide layer 14. When the potential difference between the two electrodes (12, 16) is below the MOV's voltage rating, the metal oxide layer 14 remains electrically non-conducting. However, when the potential difference between the two electrodes (12, 16) exceeds the MOV's voltage rating in an event (e.g., in an overvoltage event, surge current event, etc.), the metal oxide layer 14 becomes electrically conducting to thereby allow the current associated with the event to pass through the MOV 14 and be diverted away from an electrical component being protected.

In the example of FIG. 1, the two electrodes 12, 16 are implemented to essentially form a parallel configuration. In such a configuration, electric field is established between the two electrodes 12, 16 when a potential difference exists therebetween. Such an electric field typically has a fairly uniform field strength near the lateral center of the metal oxide layer 14. However, at or near an edge region (indicated as 20 in FIG. 1), charge density on each electrode and therefore electric field strength near the electrode is increased.

Figure 2:
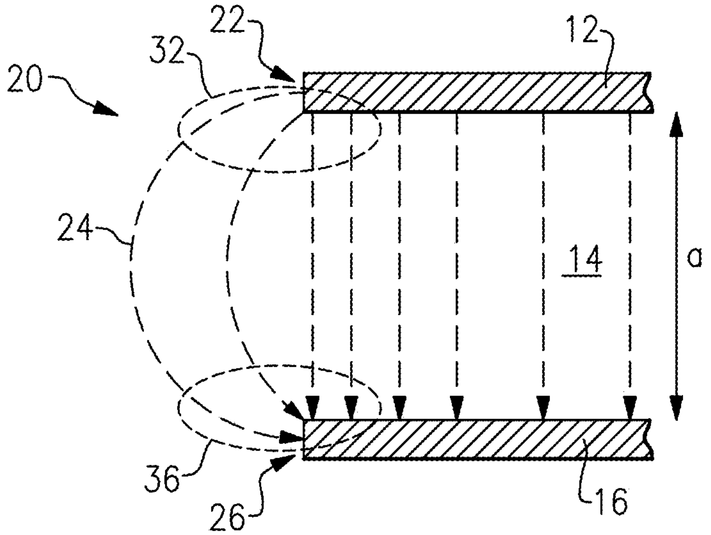
FIG. 2 depicts an example of electric field that can be established in the edge portion of the MOV of FIG. 1.

FIG. 2 depicts an example of an electric field 24 that can be established in the edge portion 20 of the MOV 10 of FIG. 1. In FIG. 2, the first electrode 12 is shown to have an edge 22, and the second electrode 16 is shown to have a corresponding edge 26. It is noted that in the example of FIG. 2, the electric field 24 is shown to originate from the first electrode 12 to the second electrode 16 (e.g., with the first electrode 12 having a net positive charge and the second electrode 16 having a net negative charge). However, it will be understood that the electric field 24 may also be directed the other direction, originating from the second electrode 16 to the first electrode 12. In a situation where the MOV 10 is subjected to an alternating current (AC), the resulting electric field between the first and second electrodes 12, 16 can have its direction alternate.

In the example of FIGS. 1 and 2, electric field strength at or near the lateral center of the metal oxide layer 14 can be approximated as $E=-\Delta V/a$, where the quantity $\Delta V$ is the potential difference and the quantity a is the separation distance between the two parallel electrodes 12, 16. At the edge region (32 for the first electrode 12 and 36 for the second electrode 16) near the edge of each electrode, the magnitude of the electric field is generally greater than the magnitude of the foregoing uniform electric field strength. Accordingly, such an edge region is more susceptible to failure.

For example, the higher concentration of charge at the edge of an electrode (and thus a higher electric field strength in the metal oxide near the electrode edge) can result in a current being concentrated near the electrode edge and resulting in overheating and damage to the MOV. In many situations, such overheating and damage to the MOV may result in a hole being burned partially or completely through the metal oxide material. More particularly, the edge region 32 associated with the first electrode edge 22 may become damaged with a hole; similarly, the edge region 36 associated with the second electrode edge 26 may become damaged with a hole.

In the example of FIG. 2, the first and second electrodes 12, 16 are assumed to have same shape and lateral dimension. Accordingly, the electric field pattern can be approximately symmetric with respect to a mid-plane between the two electrodes, and each of the edge regions 32, 36 can be susceptible to the foregoing damage.

Figure 3:
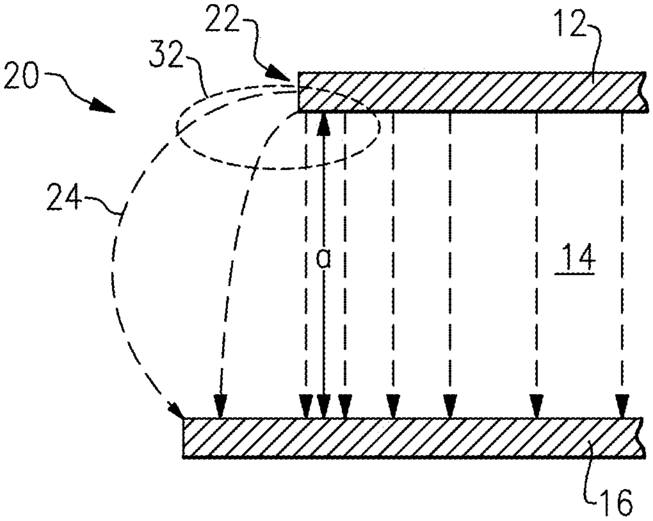
FIG. 3 shows an example of a MOV having an edge portion that is similar to the example of FIG. 2, but with one of the two electrodes having a larger lateral dimension than the other electrode.

FIG. 3 shows an example of a MOV having an edge portion 20 that is similar to the example of FIG. 2, except that in FIG. 3, one of the two electrodes 12, 16 has a larger lateral dimension than the other electrode. For example, the second electrode 16 is shown to have a larger lateral dimension than that of the first electrode 12. Accordingly, an electric field established between the two electrodes 12, 16 can result in an electric field at an edge region 32 (associated with a first electrode edge 22) that is stronger than an edge region associated with the second electrode 16. In such a configuration, the edge region 32 associated with the first electrode 12 can be more susceptible to damage than the edge region associated with the second electrode 16.

Figure 4:
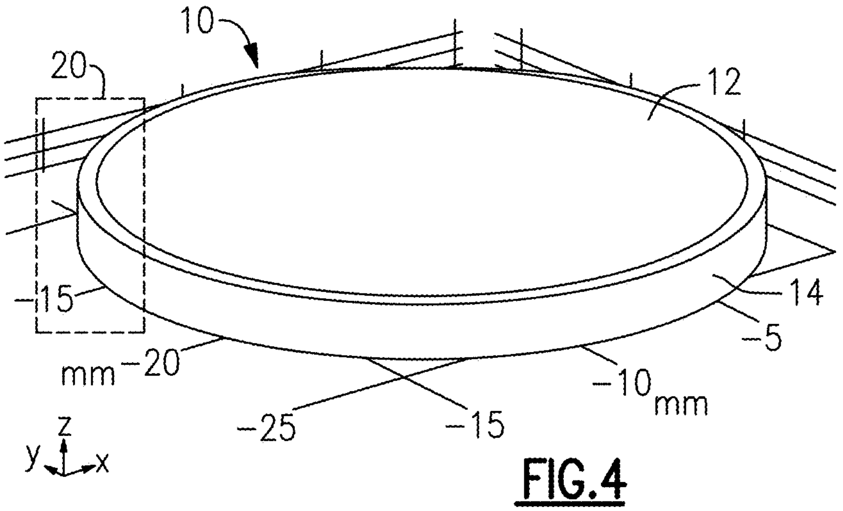
FIG. 4 shows a perspective view of the MOV of FIG. 1, implemented in a circular disk format.
Figure 5:
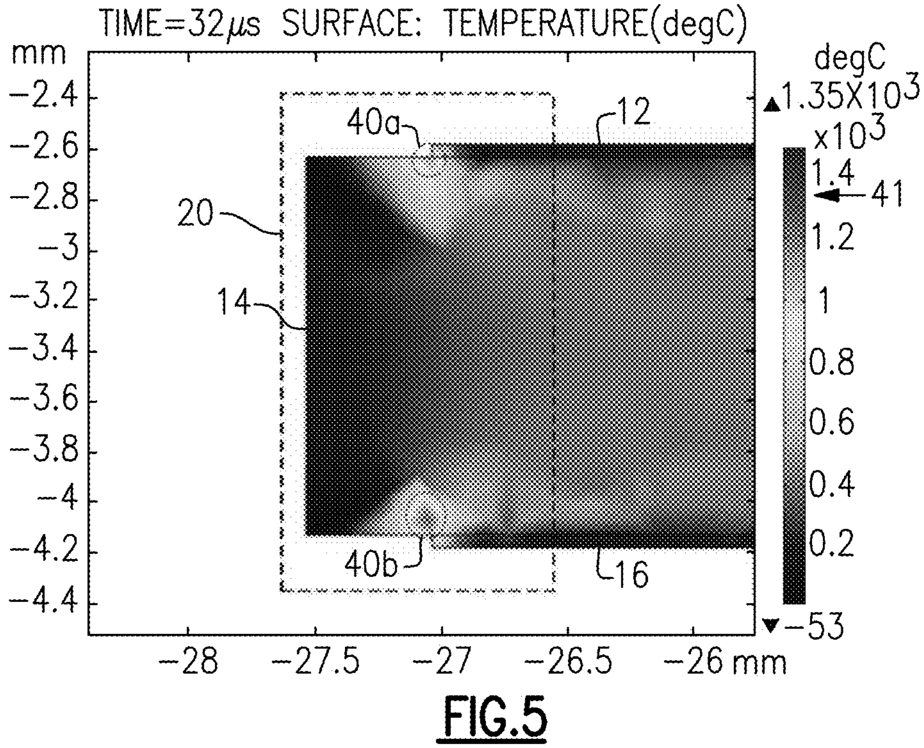
FIG. 5 shows a temperature plot of an edge portion of the MOV of FIG. 5.

FIG. 4 shows a perspective view of the MOV 10 of FIG. 1, implemented in a circular disk format. An edge portion such a MOV is indicated as 20, and FIG. 5 shows a temperature plot of such an edge portion obtained during modelling of surge current conduction. One can see that a hotspot is present near the edge of each electrode (e.g., hotspot 40*a* for the first electrode 12 and hotspot 40*b* for the second electrode 16). As described herein, such a hotspot having a temperature at or near a value indicated as 41 (e.g., approximately 1350° C.) can result in damage to the MOV.

In some embodiments, a metal oxide varistor (MOV) can include first and second electrodes implemented on first and second sides of a metal oxide layer. Either or both of such electrodes can be configured such that the MOV has an electrode-edge effect that is different (e.g., less) than an electrode-edge effect in a similarly sized MOV having substantially planar electrodes arranged in a substantially parallel manner.

For the purpose of description, the MOVs of FIGS. 2 and 3 can be considered to be examples of MOVs having substantially planar electrodes arranged in a substantially parallel manner.

For the purpose of description, an electrode-edge effect can include, for example, an electric field strength magnitude, a charge density magnitude, a temperature magnitude, etc., at or near an edge of an electrode. Such an electrode-edge effect can be obtained by simulation, modelling, measurement, extrapolation, interpolation, or some combination thereof.

In some embodiments, the foregoing MOV with a reduced electrode-edge effect can include first and second electrodes configured such that an edge of the first electrode is separated from the second electrode by an edge separation distance that is greater than a center separation distance at a lateral center of the first electrode. For the purpose of description, it will be understood that each of such edge and center separation distances is along a direction perpendicular to a mid-plane between the two electrodes. Accordingly, in each of the example MOVs of FIGS. 2 and 3, the center separation distance is the same as the edge separation distance (a) for the first electrode 12.

Figure 6:
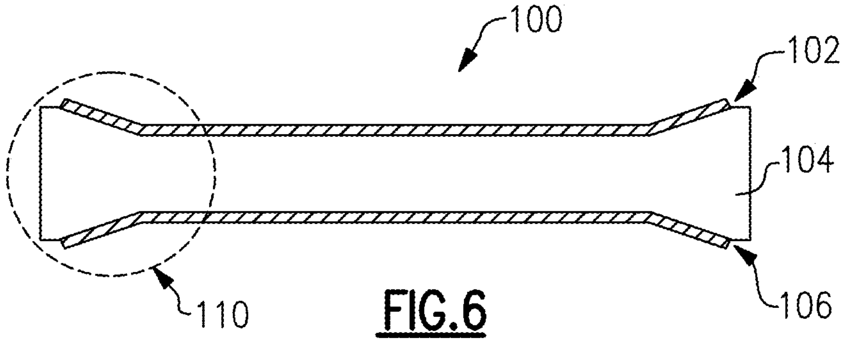
FIG. 6 shows an example of a MOV having a modified edge configuration.
Figure 7:
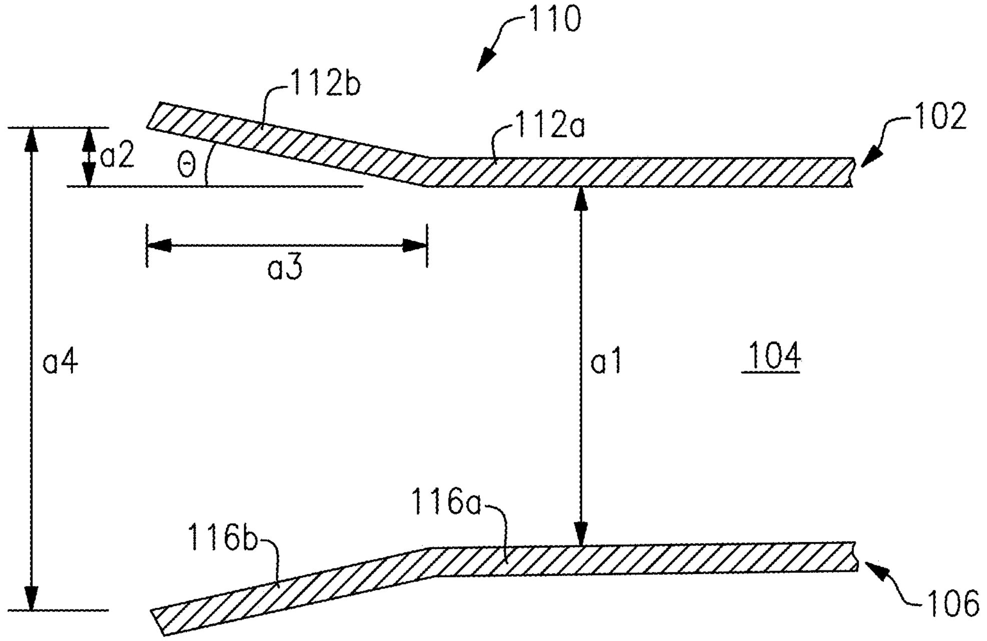
FIG. 7 shows an enlarged view of the edge portion of the MOV of FIG. 6.

FIG. 6 shows that in some embodiments, a MOV 100 can include a metal oxide layer 104 having first and second sides. A first electrode 102 can be implemented on the first side of the metal oxide layer 104, and a second electrode 106 can be implemented on the second side of the metal oxide layer 104. FIG. 7 shows an enlarged view of an edge portion 110 of the MOV 100 of FIG. 6. In the enlarged view of FIG. 7, it will be assumed that the metal oxide layer 104 has an edge profile similar to that of the side view of FIG. 6.

In the example of FIGS. 6 and 7, each of the first and second electrodes 102, 106 can include a laterally inner portion (also referred to as an inner portion) and a laterally outer portion (also referred to as an outer portion or an edge portion). The inner portions of the first and second electrodes 102, 106 can include respective planar surfaces that are substantially parallel and face each other. The outer portions of the first and second electrodes 102, 106 can be configured to be joined to their respective inner portions and flare away from each other at an angle.

When viewed in the side sectional view of FIG. 6 and the enlarged view of the edge portion 110 of the MOV 100 in FIG. 7, one can see that sections 112*a* and 112*b* represent the inner and outer portions of the first electrode 102, respectively. Similarly, sections 116*a* and 116*b* represent the inner and outer portions of the second electrode 106, respectively.

Referring to FIG. 7, the section 112*b* is shown to extend from the section 112*a* of the first electrode 102 outward by an amount a3 and away from the second electrode 106 by an amount a2, so as to form angle θ with respect to the section 112*a*. In some embodiments, the second electrode 106 can be dimensioned to be a substantially mirror image of the first electrode 102, about the mid-plane between the two electrodes. Configured in the foregoing manner, the center separation distance between the two electrodes 102, 106 is indicated as a1, and the edge separation distance between the two electrodes 102, 106 is indicated as a4, with a4 being greater than a1.

In the example of FIGS. 6 and 7, the foregoing shape of the electrodes 102, 106 can be achieved by formation of an appropriately shaped depression on each side of a flat layer of metal oxide. Examples related to processes including formation of such shaped depression are described herein in greater detail.

In the example of FIGS. 6 and 7, it is noted that the foregoing shape of the electrodes 102, 106 refers to the shape of the electrode surface that faces the other electrode. Accordingly, in such an example configuration, material that forms the electrode (102 or 106) can be provided to the shaped depression on the respective side of the metal oxide layer 104 to, for example, form a layer that conformally covers some or all of the surface of the shaped depression and partially or fully fills the shaped depression. In the example configuration of FIGS. 6 and 7, each electrode is depicted as conformally covering substantially the entire surface of the respective shaped depression, and having an approximately uniform thickness such that the electrode material partially fills the shaped depression. In another example, an electrode can be configured to cover substantially the entire surface of the respective shaped depression, and have a thickness profile (e.g., the thickness of the electrode at the center greater than the thickness of the electrode at the edge) that results in the electrode material filling more of the shaped depression (e.g., fully filling the shaped depression).

In the example of FIGS. 6 and 7, the edge portion 110 of the MOV 100 includes the straight sections 112*b*, 116*b* (when viewed in a side sectional view) of the respective electrodes 102, 106 that extend in a flaring manner. It will be understood that in some embodiments, such flared edges of the electrodes 102, 106 can also be implemented utilizing more than one straight sections for each electrode. For example, the section 112*b* of FIG. 7 can be replaced with two sections, with a first section extending from the section 112*a* at a first angle (with respect to the section 112*a*), followed with a second section extending from the first section at a second angle (with respect to the section 112*a*) that is different than the first angle. In some embodiments, the second angle can be greater than the first angle to continue the flaring pattern.

Figure 8:
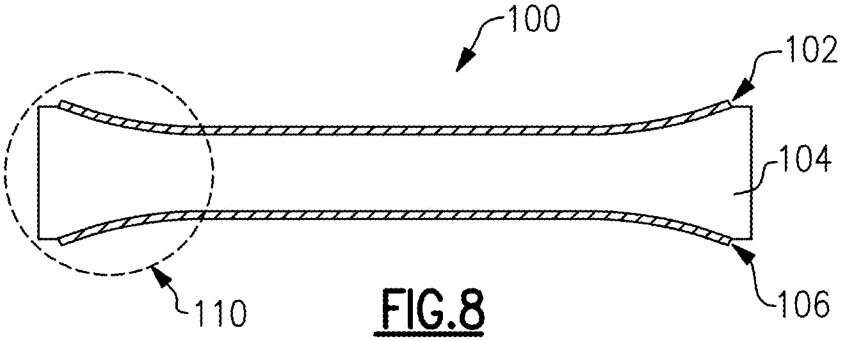
FIG. 8 shows another example of a MOV having a modified edge configuration.
Figure 9:
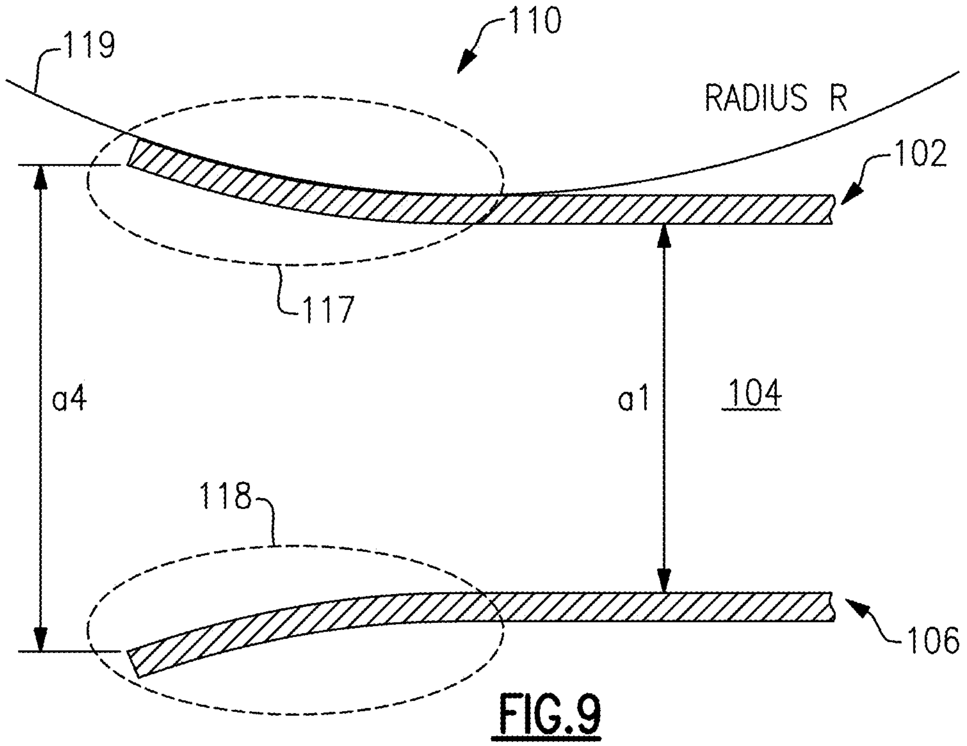
FIG. 9 shows an enlarged view of the edge portion of the MOV of FIG. 8.

In the example described above in reference to FIGS. 6 and 7, the flared edges of the electrodes 102, 106 are implemented utilizing one or more straight sections (when viewed in a side sectional view). FIGS. 8 and 9 show that in some embodiments, an edge portion 110 of a MOV 100 can be implemented utilizing a curved profile. More particularly, a MOV 100 can include a metal oxide layer 104 having first and second sides, and a first electrode 102 having a curved edge profile (when viewed in a side sectional view) can be implemented on the first side of the metal oxide layer 104, and a second electrode 106 having a curved edge profile can be implemented on the second side of the metal oxide layer 104.

In the example of FIGS. 8 and 9, each of the first and second electrodes 102, 106 can include a laterally inner portion (also referred to as an inner portion) and a laterally outer portion (also referred to as an outer portion or an edge portion). The inner portions of the first and second electrodes 102, 106 can include respective planar surfaces that are substantially parallel and face each other. The outer portions of the first and second electrodes 102, 106 can be configured to be joined to their respective inner portions and flare away from each other in a curved manner.

When viewed in a side sectional view of FIG. 8 and a closer view of an edge portion 110 of the MOV 100 in FIG. 9, one can see that portions generally indicated as 117 and 118 can represent the outer portions of the first and second electrodes 102, 106, respectively.

In some embodiments, each of the outer portions 117, 118 of the first and second electrodes 102, 106 can have a profile (when viewed in a side sectional view) that is based on a conic section, including a hyperbola, a parabola, or an ellipse. For example, in FIG. 9, the profile of the outer portion 117 can be based on a portion of a circle 119 which, for the purpose of description herein, is a type of an ellipse. Such a circle can have a radius R that can be selected to provide a desired amount of flare for the corresponding electrode 102.

In the example of FIG. 9, the second electrode 106 can be dimensioned to be a substantially mirror image of the first electrode 102, about the mid-plane between the two electrodes. Configured in the foregoing manner, the center separation distance is indicated as a1, and the edge separation distance is indicated as a4, with a4 being greater than a1.

In the example of FIGS. 8 and 9, the foregoing shape of the electrodes 102, 106 can be achieved by formation of an appropriately shaped depression on each side of a flat layer of metal oxide. Examples related to processes including formation of such shaped depression are described herein in greater detail.

In the example of FIGS. 8 and 9, it is noted that the foregoing shape of the electrodes 102, 106 refers to the shape of the electrode surface that faces the other electrode. Accordingly, in such an example configuration, material that forms the electrode (102 or 106) can be provided to the shaped depression on the respective side of the metal oxide layer 104 to, for example, form a layer that conformally covers some or all of the surface of the shaped depression and partially or fully fills the shaped depression. In the example configuration of FIGS. 8 and 9, each electrode is depicted as conformally covering substantially the entire surface of the respective shaped depression, and having an approximately uniform thickness such that the electrode material partially fills the shaped depression. In another example, an electrode can be configured to cover substantially the entire surface of the respective shaped depression, and have a thickness profile (e.g., the thickness of the electrode at the center greater than the thickness of the electrode at the edge) that results in the electrode material filling more of the shaped depression (e.g., fully filling the shaped depression).

In the example of FIGS. 6 and 7, the edge profile of each electrode is depicted as including one or more straight sections. In the example of FIGS. 8 and 9, the edge profile of each electrode is depicted as including a curved section. It will be understood that in some embodiments, an edge profile can include a straight section, a curved section, or any combination thereof.

In each of the two examples of FIGS. 6 and 7 (straight-sectioned electrode edge profile) and FIGS. 8 and 9 (curved electrode edge profile), it is assumed that the corresponding pair of electrodes are substantially mirror images of each other about the mid-plane between the two electrodes. It will be understood that in some embodiments, such a symmetry may or may not be present while providing a desired edge configuration of electrodes.

Figure 10:
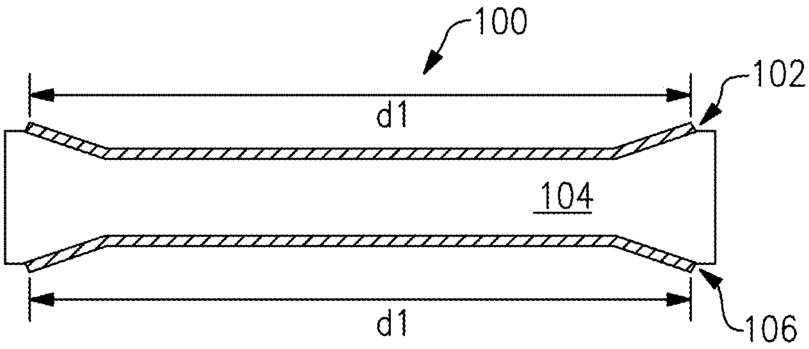
FIG. 10 shows that in some embodiments, a MOV having one or more features as described herein can be implemented to provide a symmetric configuration with respect to first and second electrodes.

For example, FIG. 10 shows a symmetric configuration for a MOV 100, and such a symmetric configuration can represent the examples of FIGS. 6 and 7 and FIGS. 8 and 9. In such a symmetric configuration, an overall electrode dimension d1 can be, for example, an overall diameter of either electrode (e.g., in a plan view of the MOV 100).

Figure 11:
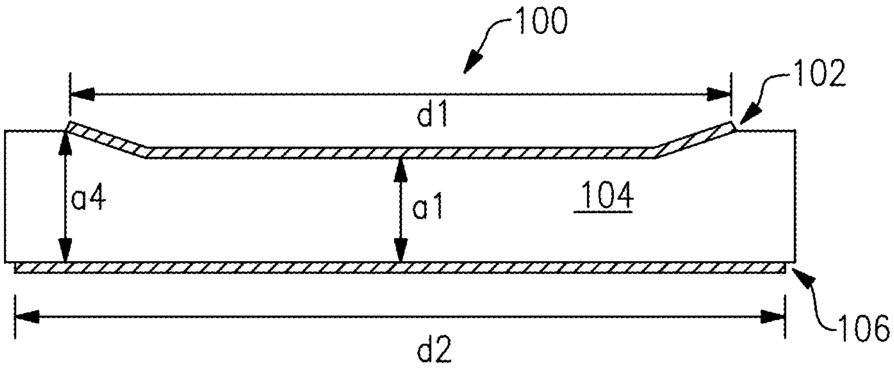
FIG. 11 shows that in some embodiments, a MOV having one or more features as described herein can be implemented to provide an asymmetric configuration with respect to first and second electrodes.

In another example, FIG. 11 shows that in some embodiments, first and second electrodes 102, 106 of a MOV do not need to be symmetric about a mid-plane between the two electrodes. In the example of FIG. 11, the first electrode 102 can be configured to provide a flared edge similar to the examples of FIGS. 6-9, while the second electrode 106 has a substantially planar configuration similar to the second electrode (16) in the example of FIG. 3. Accordingly, the first electrode 102 can have an overall dimension of d1, and the second electrode 106 can have an overall dimension of d2 that is different than d1 (e.g., d2>d1). With the foregoing configuration of the electrodes, the center separation distance is indicated as a1, and the edge separation distance is indicated as a4, with a4 being greater than a1.

Figure 12:
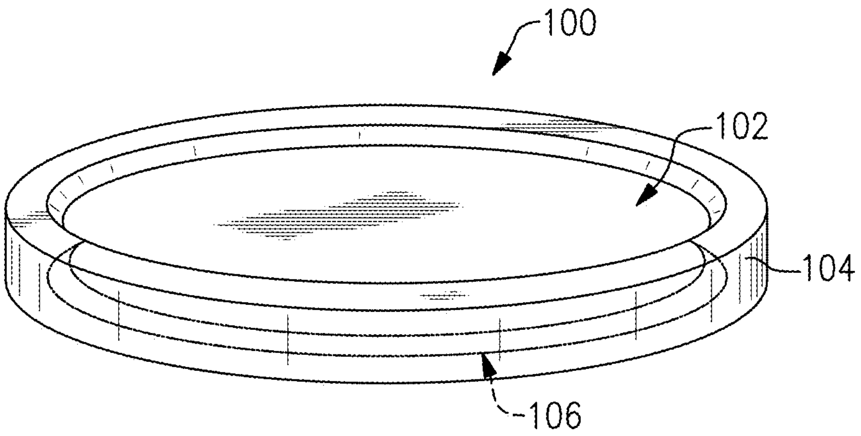
FIG. 12 shows that in some embodiments, a MOV having one or more features as described herein can be implemented in a disk shaped format.

FIG. 12 shows that in some embodiments, a MOV 100 having one or more features as described herein can be implemented in a disk shaped format. For example, a disk shaped metal oxide layer 104 can include first and second shaped depressions formed on first and second sides of the metal oxide layer 104, and such shaped depressions can be partially or fully covered with respective electrodes 102, 106. Accordingly, the resulting first and second electrodes 102, 106 can have respective surfaces that face each other and form flared edge profiles as described herein.

In the example of FIG. 12, the shaped depressions and corresponding electrodes 102, 106 are depicted as being similar to the straight-sectioned electrode edge profile example of FIGS. 6 and 7. However, it will be understood that the disk shaped example of FIG. 12 can also utilize the curved electrode edge profile configuration of FIGS. 8 and 9, and/or the asymmetric configuration of FIG. 11.

Figure 13A:
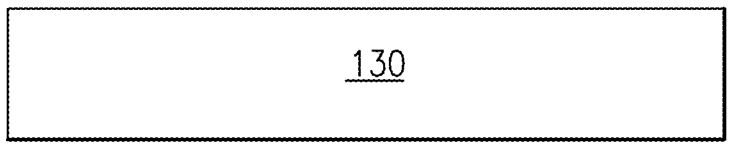
FIGS. 13A to 13D show an example process that can be utilized to fabricate a MOV having one or more features as described herein.

In the context of the disk shaped example of FIG. 12, FIGS. 13A-13D show an example process that can be utilized to fabricate a MOV having one or more features as described herein. In some embodiments, such a process can include a flat disk shaped metal oxide 130 being provided or formed, as shown in FIG. 13A.

Figure 13B:
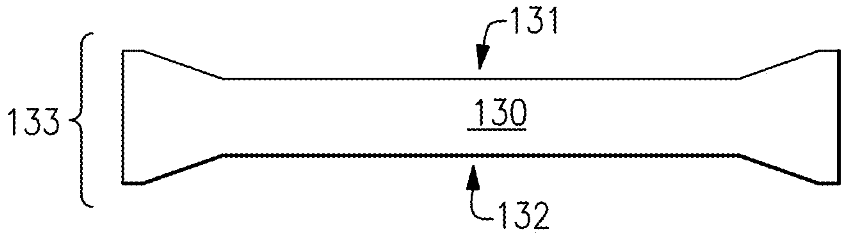

In a process step of FIG. 13B, a first shaped depression 131 can be formed on the first side of the metal oxide 130, and a second shaped depression 132 can be formed on the second side of the metal oxide 130, so as to form an assembly 133. In some embodiments, each of such shaped depressions can be formed by, for example, application of pressure with a shaped tool, by removal of material, or some combination thereof.

In the example process steps shown in FIGS. 13A and 13B, it is assumed that the shaped depressions (131, 132) are formed from a flat metal oxide disk 130 that has already been formed. In some embodiments, the shape of FIG. 13B can be formed directly without having to first form a flat disk.

For example, the shape of FIG. 13B (with the shaped depressions 131, 132) can be press-formed directly from powder under high pressure. In some embodiments, such powder can include materials for yielding metal oxide functionality (e.g., ZnO and dopants), as well as one or more binder materials (e.g., organic binder materials). Following such press-forming, a process step can be achieved to burn off the binder materials by heating the press-formed assembly above the ignition temperature of the binder materials, thereby leaving only the ceramic materials and traces of the binder materials. Such a ceramic state is sometimes referred to as a green state. The green state ceramic assembly can then be sintered at a sufficiently high temperature to yield a cured state. Such a sintering process can shrink the size of the ceramic assembly (e.g., by about 20%). Accordingly, in some embodiments, the assembly 133 in FIG. 13B can be such a sintered ceramic assembly.

Figure 13C:
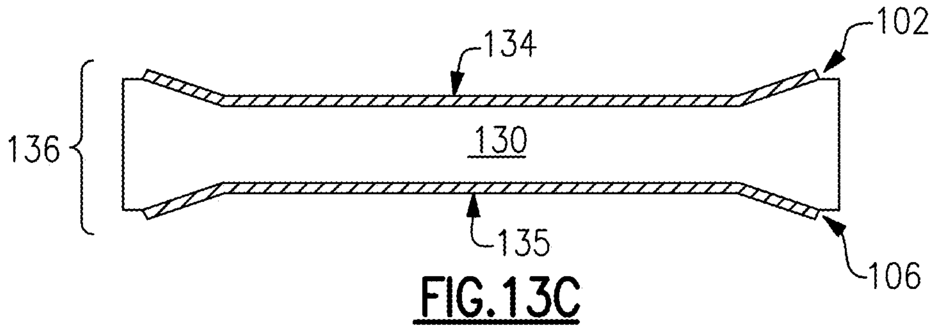

In a process step of FIG. 13C, a first electrode 134 can be formed on the first side of the metal oxide 130 so as to partially or fully cover the first shaped depression (131 in FIG. 13B), and a second electrode 135 can be formed on the second side of the metal oxide 130 so as to partially or fully cover the second shaped depression (132 in FIG. 13B), so as to form an assembly 136. In some embodiments, each of such electrodes can be formed with, for example, silver, copper, tungsten, silver overplated with nickel or tin, etc. Formation of such electrodes can be achieved by, for example, screen printing, pad printing, or evaporation/photo-etch techniques, etc.

Figure 13D:
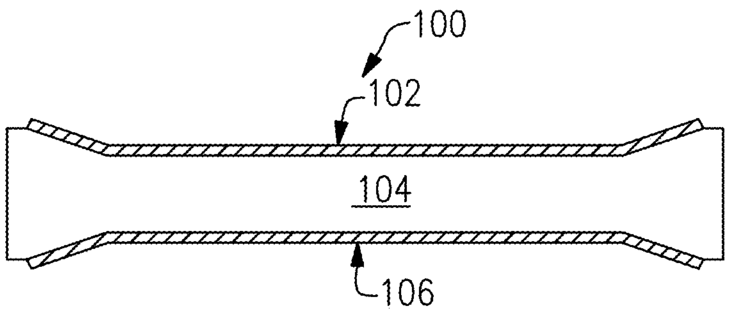

In a process step of FIG. 13D, the assembly 136 of FIG. 13C can be subjected to one or more curing processes (e.g., oven bake process) to bond the electrode metal to the metal oxide, to thereby yield a MOV 100 having one or more features as described herein.

In the example process of FIGS. 13A-13D, fabrication of one MOV is depicted. In some embodiments, a plurality of MOVs can be fabricated in an array format, and such MOVs can be singulated into a plurality of individual MOVs. FIGS. 14A-14F show an example of such a fabrication process where at least some of process steps are performed while a plurality of units are attached in an array format.

Figures 14A, 14B, 14C, 14D:
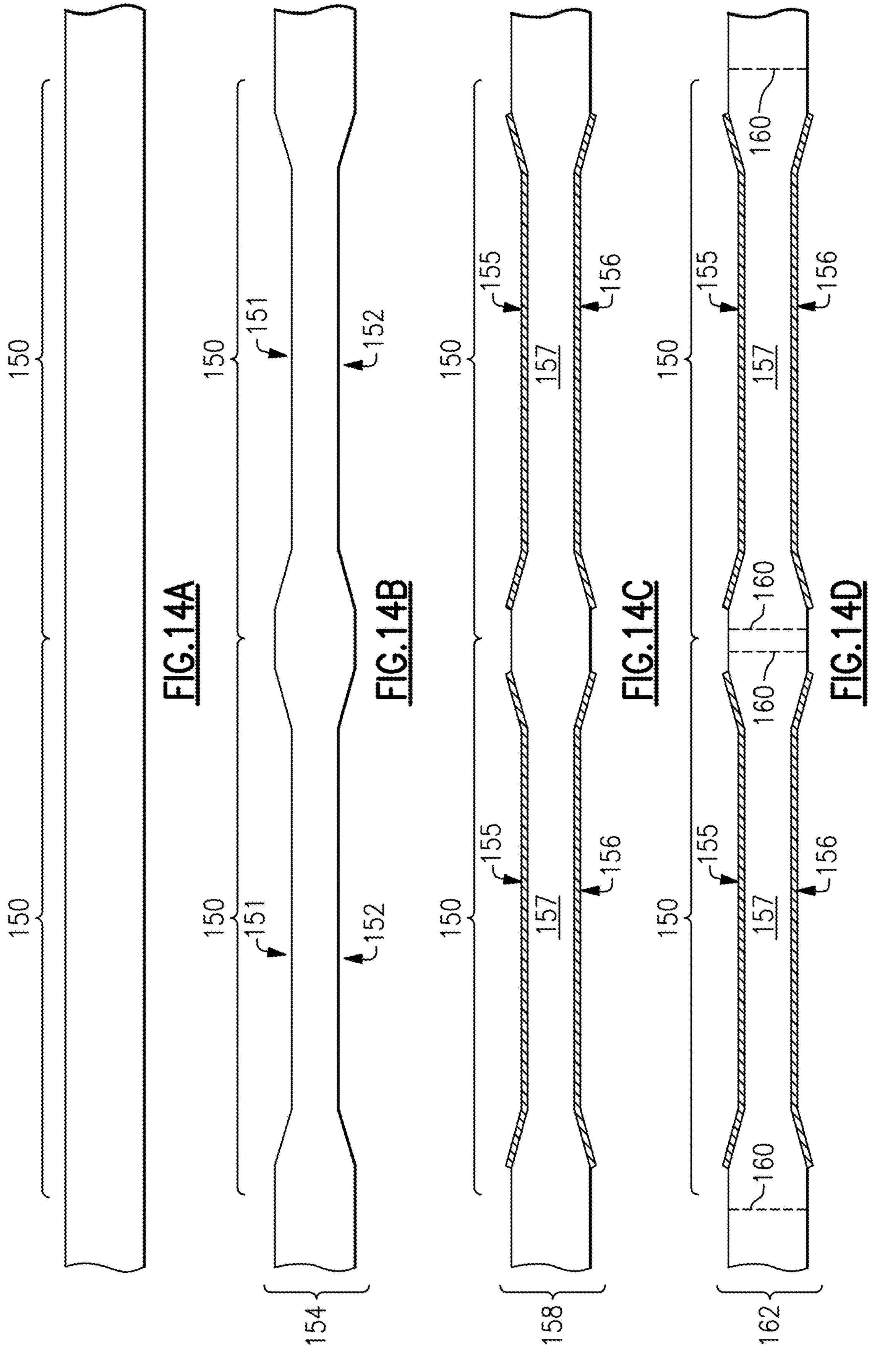
FIGS. 14A to 14F show an example of a process that can be utilized to fabricate a plurality of MOVs, where at least some of process steps are performed while a plurality of units are attached in an array format.

For example, FIG. 14A shows a process step where a plate of metal oxide can be provided or formed. Such a plate is shown to include a plurality of units 150 where each unit will eventually become a MOV.

In a process step of FIG. 14B, a first shaped depression 151 can be formed on the first side of the metal oxide for each unit 150, and a second shaped depression 152 can be formed on the second side of the metal oxide for each unit 150, so as to form an assembly 154. In some embodiments, each of such shaped depressions can be formed as described herein in reference to FIG. 13B.

In a process step of FIG. 14C, a first electrode 155 can be formed on the first side of the metal oxide for each unit 150 so as to partially or fully cover the respective first shaped depression, and a second electrode 156 can be formed on the second side of the metal oxide for each unit 150 so as to partially or fully cover the respective second shaped depression, so as to form an assembly 158. In some embodiments, each of such electrodes can be formed as described herein in reference to FIG. 13C.

In a process step of FIG. 14D, the assembly 158 of FIG. 14C can undergo one or more processes to singulate each of the units 150 from an array 162. For example, a singulation process such as stamping, cutting, etc. can be performed along unit boundaries 160 so as to remove the units 150 from the array 162.

Figure 14E:
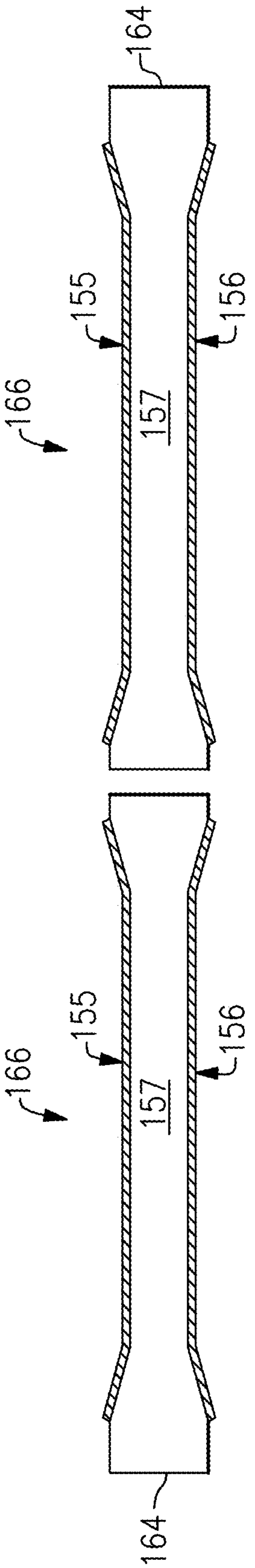

In a process step of FIG. 14E, the singulated units from the process step of FIG. 14D are indicated as 166, with each having first and second electrodes 155, 156 formed on first and second shaped depressions of a metal oxide layer 157. Such a metal oxide layer is also shown to include a side wall 164 resulting from the singulation process.

Figure 14F:
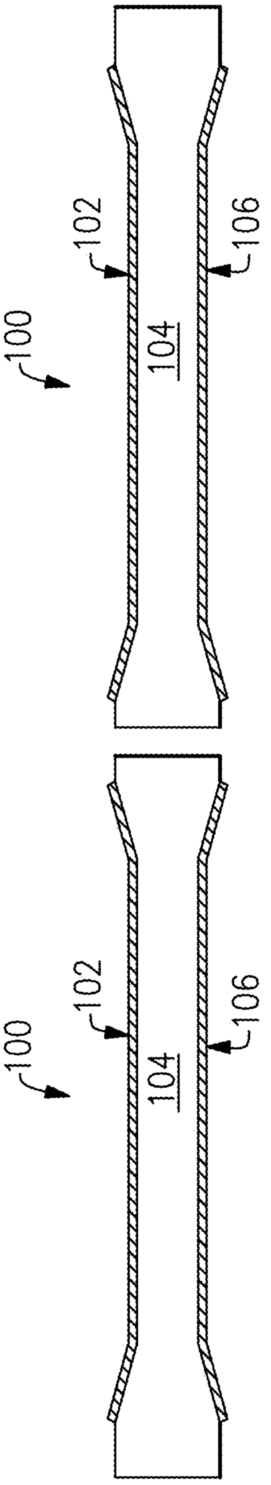

In a process step of FIG. 14F, the singulated units 166 of FIG. 14E can be subjected to one or more curing processes (e.g., sintering process) to cure the electrodes and/or the metal oxide, to thereby yield a plurality of MOVs 100 having one or more features as described herein.

Figure 15:
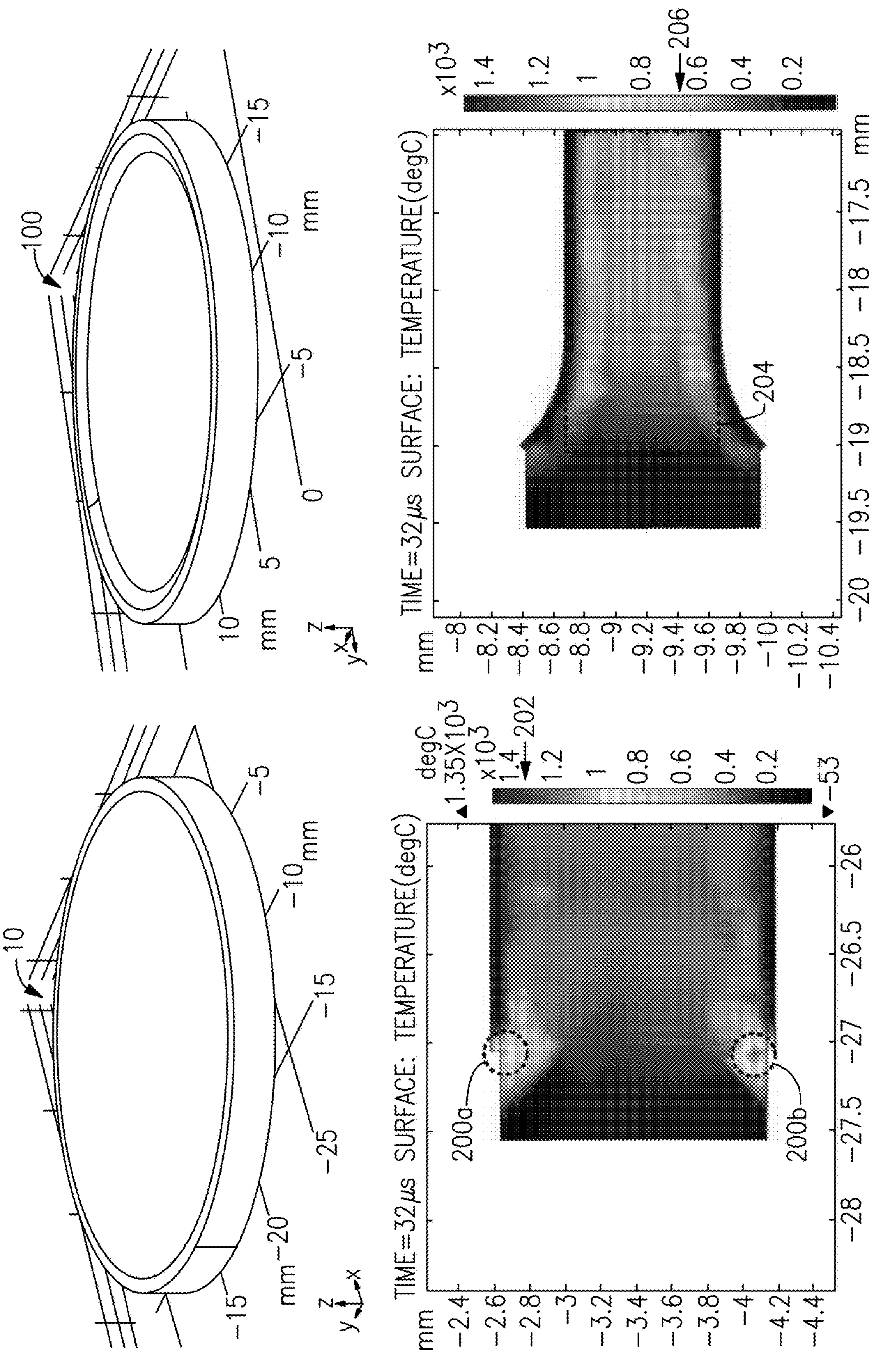
FIG. 15 shows a comparison of a conventional MOV without a modified edge configuration with a MOV having a modified edge configuration.

As described herein in reference to FIGS. 1-5, a conventional MOV can suffer from one or more hotspots at or near an edge portion of its electrodes. FIG. 15 shows a side-by-side comparison of such a conventional MOV 10 (similar to the example of FIG. 4) with a MOV 100 having flared-edge electrodes as described herein (e.g., similar to the example of FIGS. 8 and 9). Below the conventional MOV 10 is a temperature plot of an edge portion of such a MOV, obtained during modelling of surge current conduction. One can see that a hotspot is present near the edge of each electrode. Such hotspots are indicated as 200*a* for the upper electrode and as 200*b* for the lower electrode, and each hotspot is shown to have a relatively high temperature value indicated as 202 (e.g., approximately 1350° C.) that is significantly higher than an average temperature for an inward volume of metal oxide between the electrodes.

Referring to the comparison of FIG. 15, below the MOV 100 is a temperature plot of a portion of such a MOV, obtained during modelling of surge conduction. One can see that at or near the edge of each electrode, there is desirably no hotspot at or near the edge of each electrode. More particularly, the region near the edge of each electrode is shown to have a temperature value indicated as 206 that is no higher than an average temperature for a volume 204 of metal oxide between the electrodes.

Figure 16A:
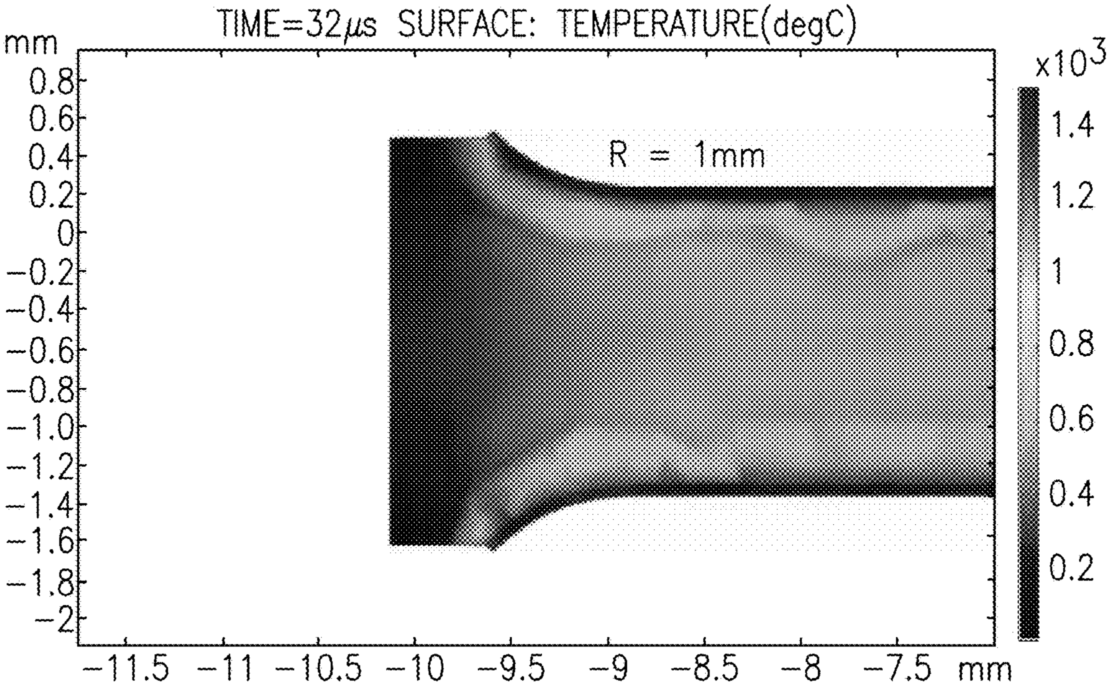
FIGS. 16A and 16B show an example of variation of an edge effect that can depend on variation of an edge profile of a MOV.
Figure 16B:
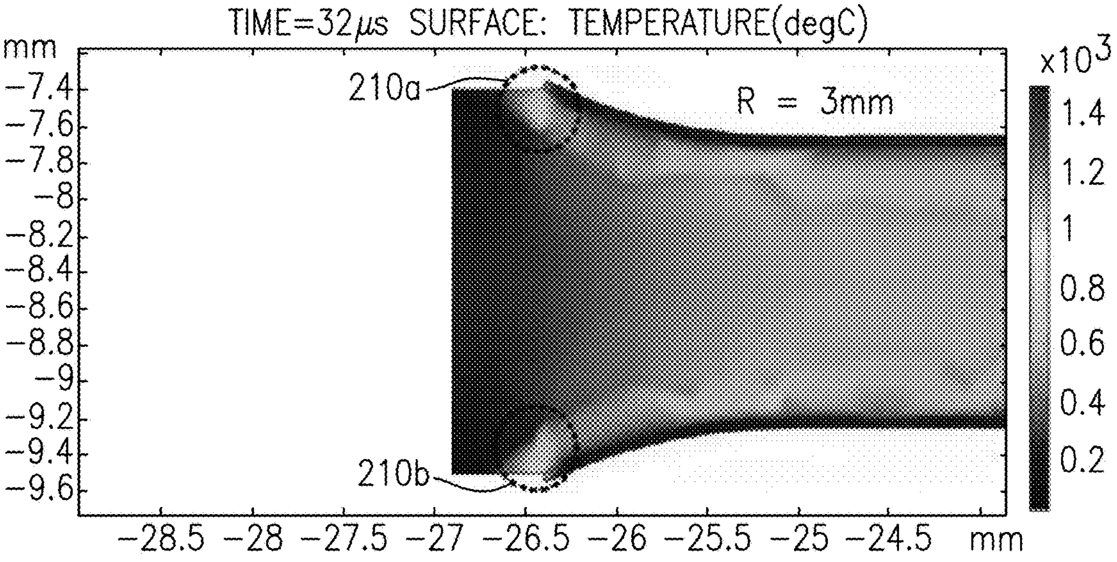

In the examples of FIG. 15, the edge flare configuration of the MOV 100 is achieved by a curved edge profile having a finite radius of curvature of R. In such a context, the non-flared configuration of the MOV 10 having a straight edge profile can be considered to have an infinite radius of curvature. Thus, one can expect that if a radius of curvature of a curved edge profile of an electrode is large, an edge effect such as hotspot will be more prominent than in a curved edge profile with a smaller radius of curvature. FIGS. 16A and 16B, showing temperature plots obtained during modelling of surge current conduction, demonstrate such an effect.

In the example of FIG. 16A, a curved edge profile of each electrode has a radius of curvature R of approximately 1 mm; and in the example of FIG. 16B, a curved edge profile of each electrode has a radius of curvature R of approximately 3 mm. In the R=1 mm case (FIG. 16A), there is no observable hotspots at the edges of the electrodes. In the R=3 mm case (FIG. 16B), there are regions 210*a*, 210*b* near the electrodes where temperatures are elevated. Such elevated temperature spots may or may not be within some design limits; however, they are at a lower temperature than the hotspots 200*a*, 200*b* of the example MOV 10 of FIG. 15.

Based on the examples of FIGS. 16A and 16B, one can see that there can be one or more preferred geometries that can provide one or more desired features of a MOV. For example, and referring to the edge portion configuration of FIG. 7, the dimension a2 can be a fraction of the center separation distance a1, such that $a2=f\times a1$ where f is a fraction. In some embodiments, the fraction f can have a value in a range of $0.01<f<0.40$, $0.05<f<0.25$, or $0.08<f<0.21$. In some embodiments, the fraction f can have a value of approximately 0.2. It will be understood that other values or ranges of f can also be utilized.

In another example, and referring to the edge portion configuration of FIG. 7, the dimension a3 can be a fraction of the overall diameter D of the MOV, such that $a3=f\times D$ where f is a fraction. In some embodiments, the fraction f can have a value in a range of $0.001<f<0.05$, $0.005<f<0.045$, $0.01<f<0.04$, $0.015<f<0.035$, or $0.02<f<0.03$. In some embodiments, the fraction f can have a value of approximately 0.025. In some embodiments, the fraction f can have a value in a range of $0.02<f<0.40$, or $0.05<f<0.20$. In some embodiments, the fraction f can have a value of approximately 0.14, approximately 0.10, or approximately 0.08. It will be understood that other values or ranges of f can also be utilized.

Table 1 lists various dimensions of a number of example MOV devices implemented in a disk format with electrodes having flared edge portions similar to the configuration of FIGS. 6 and 7. In Table 1, such MOV devices are also referred to as 10 mm, 14 mm and 20 mm devices, and the listed dimensions are approximate values in mm. The quantity D refers to overall diameter of the corresponding MOV device (100 in FIG. 6), electrode diameter refers to the overall diameter of each electrode (102 or 106 in FIG. 6) of the MOV device, flat portion diameter refers to the diameter of the parallel portion (112*a* or 116*a* of FIG. 7) of the corresponding electrode, and the quantities a3, a2 and a1 are as shown in FIG. 7.

TABLE 1

| Device | D | Electrode diameter | Flat diameter | a3 | a2 | a1 |
|---|---|---|---|---|---|---|
| 10 mm | 10.70 | 8.20 | 5.20 | 1.5 | 0.2 | 0.95 |
| 10 mm | 10.70 | 8.20 | 5.20 | 1.5 | 0.2 | 1.20 |
| 10 mm | 10.70 | 8.20 | 5.20 | 1.5 | 0.2 | 1.27 |
| 10 mm | 10.70 | 8.20 | 5.20 | 1.5 | 0.2 | 1.32 |
| 10 mm | 10.70 | 8.20 | 5.20 | 1.5 | 0.2 | 1.50 |
| 10 mm | 10.70 | 8.20 | 5.20 | 1.5 | 0.2 | 1.55 |
| 14 mm | 14.50 | 10.85 | 8.00 | 1.4 | 0.2 | 0.96 |
| 14 mm | 14.50 | 10.85 | 8.00 | 1.4 | 0.2 | 1.20 |
| 14 mm | 14.50 | 10.85 | 8.00 | 1.4 | 0.2 | 1.28 |
| 14 mm | 14.50 | 10.85 | 8.00 | 1.4 | 0.2 | 1.35 |
| 14 mm | 14.50 | 10.85 | 8.00 | 1.4 | 0.2 | 1.50 |
| 14 mm | 14.50 | 10.85 | 8.00 | 1.4 | 0.2 | 1.51 |
| 14 mm | 14.50 | 10.85 | 8.00 | 1.4 | 0.2 | 1.81 |
| 14 mm | 14.50 | 10.85 | 8.00 | 1.4 | 0.2 | 1.97 |
| 14 mm | 14.50 | 10.85 | 8.00 | 1.4 | 0.2 | 2.22 |
| 14 mm | 14.50 | 10.85 | 8.00 | 1.4 | 0.2 | 2.45 |
| 20 mm | 18.80 | 14.30 | 11.40 | 1.5 | 0.2 | 1.30 |
| 20 mm | 18.80 | 14.30 | 11.40 | 1.5 | 0.2 | 1.35 |
| 20 mm | 18.80 | 14.30 | 11.40 | 1.5 | 0.2 | 1.50 |
| 20 mm | 18.80 | 14.30 | 11.40 | 1.5 | 0.2 | 1.55 |
| 20 mm | 18.80 | 14.30 | 11.40 | 1.5 | 0.2 | 1.73 |
| 20 mm | 18.80 | 14.30 | 11.40 | 1.5 | 0.2 | 1.93 |
| 20 mm | 18.80 | 14.30 | 11.40 | 1.5 | 0.2 | 2.32 |
| 20 mm | 18.80 | 14.30 | 11.40 | 1.5 | 0.2 | 2.45 |

In yet another example, and referring to the edge portion configuration of FIG. 9, the radius of curvature, R, can be based on the center separation distance a1, such that $R=m\times a1$, where m is a real number in a range of $0.1<m<2.0$, $0.2<m<1.5$, $0.3<m<1.0$, $0.4<m<0.9$, or $0.5<m<0.8$. In some embodiments, value of R can be within the range $0.5<m<0.8$, such that for an example where the center separation distance a1 is approximately 1.6 mm, R can be in a range of 0.8 mm<R<1.2 mm. It will be understood that other values or ranges of m and/or R can also be utilized.

In the foregoing examples of dimensional ranges, an edge configuration (e.g., a2, a3 or R) can depend on another dimension associated with the corresponding MOV. It will be understood that in some embodiments, one or more edge configuration dimensions can be based on an operating parameter or condition of an MOV, instead of directly depending on other dimension(s).

Figure 17:
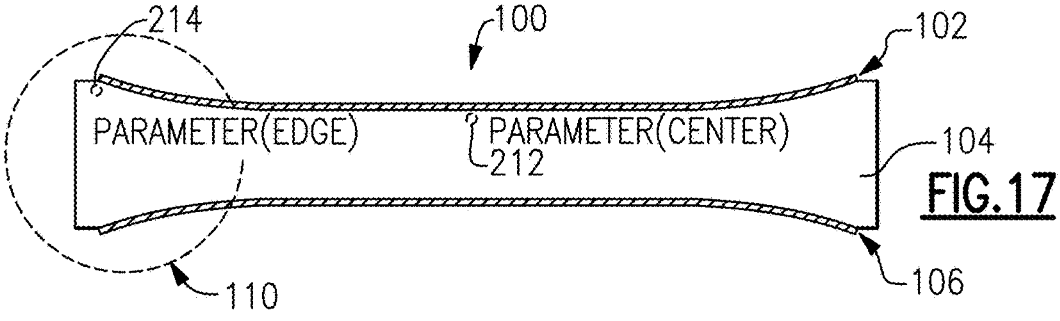
FIG. 17 shows that in some embodiments, an edge portion of an electrode of a MOV can be configured such that an edge parameter of the MOV is within a selected range with respect to a center parameter of the MOV.

For example, FIG. 17 shows a MOV 100 that is similar to the MOV of FIG. 8. Such a MOV can have a parameter such as, for example, temperature, electric field strength, surface charge density, etc., at or near an electrode. Thus, a parameter at or near the center of an electrode 102 is indicated as 212 (also referred to herein as a center parameter), and a parameter at or near the edge of the electrode 102 is indicated as 214 (also referred to herein as an edge parameter).

In some embodiments, and referring to FIG. 17, an edge portion of an electrode can be configured (e.g., radius of curvature of a curved end profile or angle and length of a straight section of an end profile) such that the magnitude of the edge parameter is within a selected range with respect to the magnitude of the center parameter.

Thus, in some embodiments, the edge parameter of a MOV can have a magnitude that is, for example, within ±50% of the magnitude of the center parameter, within ±40% of the magnitude of the center parameter, within ±30% of the magnitude of the center parameter, within ±20% of the magnitude of the center parameter, or within ±10% of the magnitude of the center parameter.

If the MOV parameter is temperature, the edge temperature of a MOV can have a magnitude that is, for example, within ±50% of the magnitude of the center temperature, within ±40% of the magnitude of the center temperature, within ±30% of the magnitude of the center temperature, within ±20% of the magnitude of the center temperature, or within ±10% of the magnitude of the center temperature.

If the MOV parameter is electric field strength, the edge electric field strength of a MOV can have a magnitude that is, for example, within ±50% of the magnitude of the center electric field strength, within ±40% of the magnitude of the center electric field strength, within ±30% of the magnitude of the center electric field strength, within ±20% of the magnitude of the center electric field strength, or within ±10% of the magnitude of the center electric field strength.

If the MOV parameter is surface charge density, the edge surface charge density of a MOV can have a magnitude that is, for example, within ±50% of the magnitude of the center surface charge density, within ±40% of the magnitude of the center surface charge density, within ±30% of the magnitude of the center surface charge density, within ±20% of the magnitude of the center surface charge density, or within ±10% of the magnitude of the center surface charge density.

It will be understood that other values or ranges of the foregoing parameters can also be utilized. It will also be understood that other parameters associated with a MOV can also be utilized.

Figure 18A:
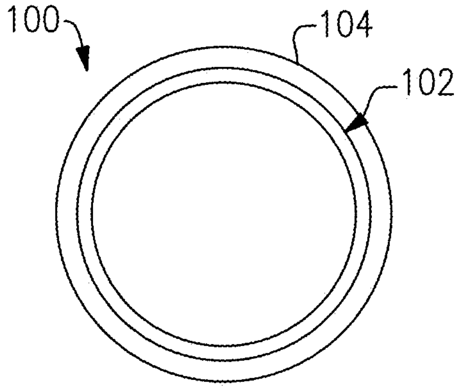
FIGS. 18A to 18C show that a MOV having one or more features as described herein can be implemented in different form factors.
Figure 18B:
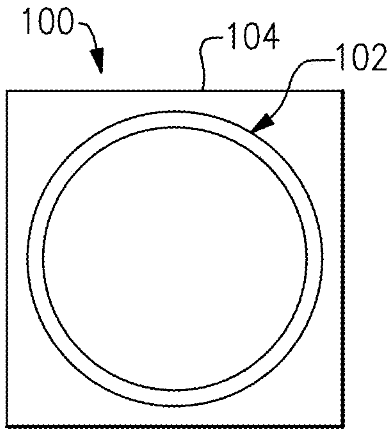
Figure 18C:
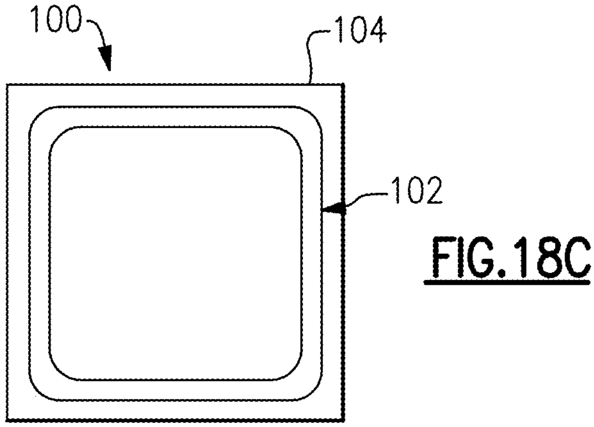

FIGS. 18A-18C show that a MOV having one or more features as described herein can be implemented in different form factors. For example, FIG. 18A shows a MOV 100 having a disk shaped metal oxide layer 104 and circular shaped electrodes (first electrode 102 shown, and second electrode 106 hidden from view).

In another example, and as shown in FIG. 18B, a MOV 100 can have a rectangular shaped metal oxide layer 104 and circular shaped electrodes. Similar to the example of FIG. 18A, first electrode 102 is shown, and second electrode 106 is hidden from view.

In yet another example, and as shown in FIG. 18C, a MOV 100 can have a rectangular shaped metal oxide layer 104 and rectangular shaped electrodes. Similar to the example of FIG. 18A, first electrode 102 is shown, and second electrode 106 is hidden from view. In the example of FIG. 18C, each corner in the rectangular shaped electrode 102 (and also in electrode 106) can be radiused to reduce the effect of a sharp corner (e.g., a right-angle corner).

It is noted that in each of the example shapes of FIGS. 18A-18C, a side sectional view of such a device (e.g., along a mid-line through the center of each device) can include any of the example edge configurations described in reference to FIGS. 6-11, 13 and 14. Accordingly, it will be understood that a MOV having an edge configuration as described herein can be implemented in devices having different lateral shapes, including the examples of FIGS. 18A-18C.

It is also noted that various examples are described herein in the context of an edge of an electrode being an outer perimeter edge. However, there may be an electrode configuration where an edge exists laterally inward of the perimeter. For example, suppose that an electrode has an annulus shape when viewed from the electrode side of the corresponding MOV device (e.g., a plan view as in FIGS. 18A-18C). Such an annulus shaped electrode includes an outer edge at the outer perimeter, and an inner edge at the inner ring. Accordingly, it will be understood that one or more features of the present disclosure can be implemented for any edges, including outer edges, inner edges, or any combination thereof.

In various examples described herein in reference to FIGS. 1-18, a MOV is depicted as having one set of electrodes implemented for a given layer of metal oxide. It will be understood that in some embodiments, a given layer of metal oxide can be provided with a plurality of sets of electrodes.

Figure 19:
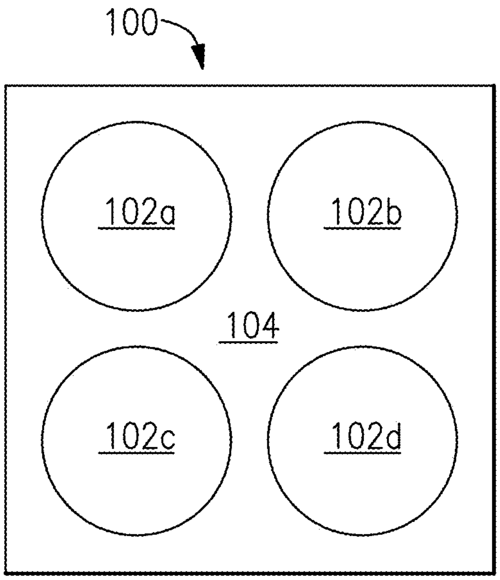
FIG. 19 shows that in some embodiments, a MOV having one or more features as described herein can include more than one set of electrodes implemented with respect to a given metal oxide layer, with at least some of such sets of electrodes having a modified edge configuration.

For example, FIG. 19 shows a MOV 100 having a metal oxide layer 104, and multiple sets of electrodes implemented with respect to the metal oxide layer 104. The first set of electrodes can include a first electrode 102*a* and a second electrode 106*a* (hidden from view); the second set of electrodes can include a first electrode 102*b* and a second electrode 106*b* (hidden from view); the third set of electrodes can include a first electrode 102*c* and a second electrode 106*c* (hidden from view); and the fourth set of electrodes can include a first electrode 102*d* and a second electrode 106*d* (hidden from view). In some embodiments, some or all of such sets of electrodes can include an edge configuration as described herein. It will be understood that a MOV can include more or less numbers of sets of electrodes than the four-set example of FIG. 19.

Figure 20:
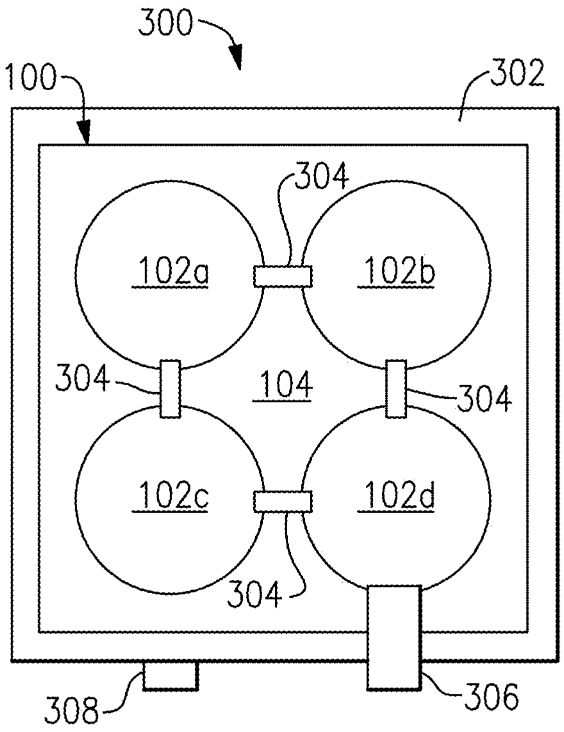
FIG. 20 shows an example of how the multi-set electrode MOV of FIG. 19 can be configured as an electrical device.

FIG. 20 shows an example of how the multi-set electrode MOV 100 of FIG. 19 can be configured as an electrical device 300. For example, the first electrodes 102 of the four sets can be electrically connected through conductive features 304, and such connected first electrodes can be electrically connected to a first terminal 306. Similarly, the second electrodes (106) of the four sets can be electrically connected through conductive features, and such connected second electrodes can be electrically connected to a second terminal 308. FIG. 20 also shows that the MOV 100 can be provided with a packaging material 302 to, for example, protect the electrodes.

Figure 21:
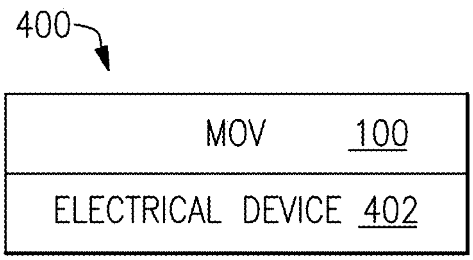
FIG. 21 shows that in some embodiments, a MOV having one or more features as described herein can be combined with one or more other electrical devices to provide a combined device.

FIG. 21 shows that in some embodiments, a MOV 100 having one or more features as described herein can be combined with one or more other electrical devices 402 to provide a combined device 400. In some embodiments, such a combination of MOV and another electrical device can include an electrode of the MOV 100 being electrically connected to an electrode of the other electrical device 402. In some embodiments, such combination of MOV and another electrical device can include an electrode of the MOV being shared as an electrode of the other electrical device.

Figure 22:
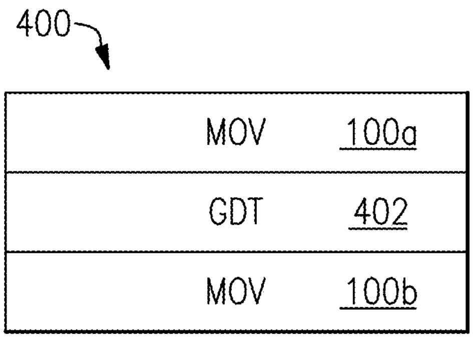
FIG. 22 shows that in some embodiments, the one or more other electrical devices of FIG. 21 can be one or more gas discharge tubes (GDTs).

FIG. 22 shows that in some embodiments, the one or more other electrical devices of FIG. 21 can be one or more gas discharge tubes (GDTs). For example, a combination device 400 can include a MOV implemented on each side of a GDT. Accordingly, in some embodiments, the combination device 400 can include a first MOV 100*a*, a GDT 402 and a second MOV 100*b* arranged in series. Examples related to such a combination device are described herein in greater detail.

Among others, International Publication No. WO 2020/047381 (International Application No. PCT/2019/049008 titled INTEGRATED DEVICE HAVING GDT AND MOV FUNCTIONALITIES) which is expressly incorporated by reference in its entirely and its disclosure is to be considered part of the specification of the present application discloses various embodiments of an electrical device having gas discharge tube (GDT) and metal oxide varistor (MOV) functionalities. In some embodiments, and referring to the example of FIG. 22, such an electrical device can include a series arrangement of a first MOV 100*a*, a GDT 402 and a second MOV 100*b*. In such a configuration, the first MOV 100*a* can have one of its electrodes also function as an electrode of the GDT 402. Such an electrode can be referred to as a first shared electrode. Similarly, the second MOV 100*b* can have one of its electrodes also function as an electrode of the GDT 402. Thus, such an electrode can be referred to as a second shared electrode.

Figure 23:
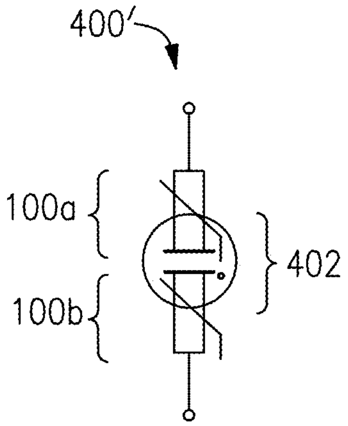
FIG. 23 shows a circuit representation of a GDT/MOV device that includes a series arrangement of a first MOV, a GDT, and a second MOV, where the first MOV has one of its electrodes also function as one of the electrodes of the GDT, and the second MOV has one of its electrodes also function as the other of the electrodes of the GDT.

FIG. 23 shows a circuit representation 400' of the foregoing electrical device utilizing shared electrodes. Accordingly, in the circuit representation 400', each electrode of the GDT portion 402 is shown to overlap with the respective MOV portion (100*a* or 100*b*).

Figure 24:
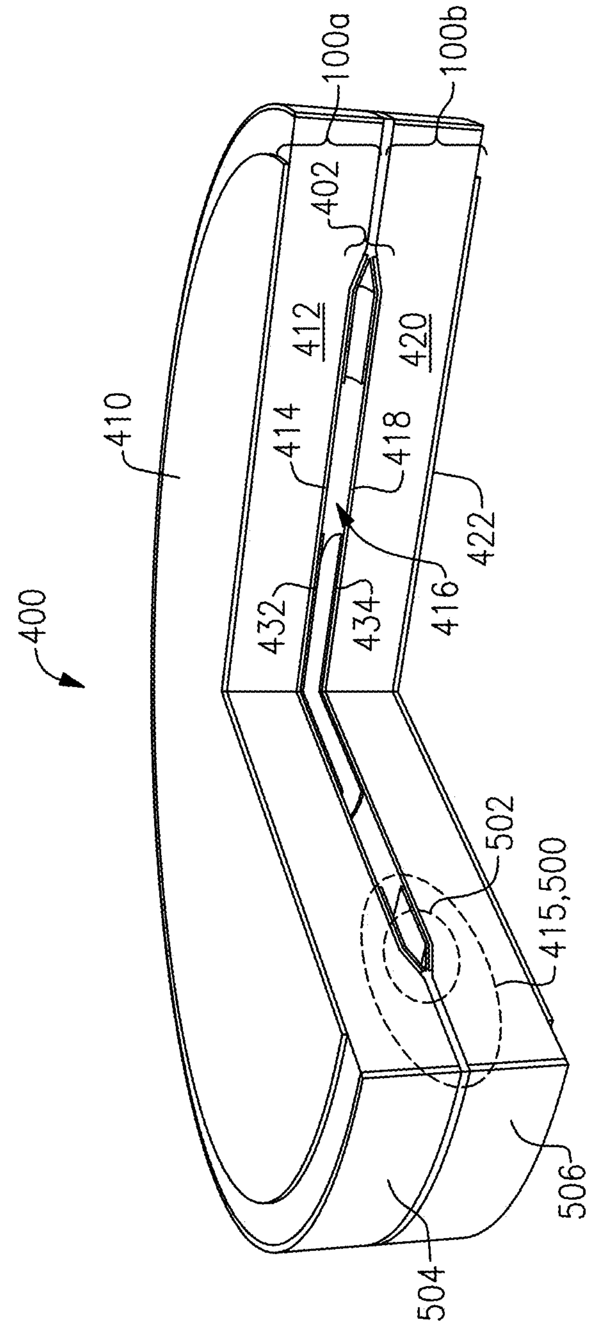
FIG. 24 shows a perspective cutaway view of a GDT/MOV device having one or more features as described herein.

FIG. 24 shows that in some embodiments, an electrical device can be implemented in accordance with the examples of FIGS. 22 and 23, where at least one MOV is configured to provide a reduced electrode-edge effect as described herein. For example, FIG. 24 shows that in some embodiments, a GDT/MOV device 400 can include a sealed chamber 416 having opposing sides. A first electrode 414 can be implemented on one of such opposing sides, and a second electrode 418 can be implemented on the other side, thereby providing a GDT configuration 402 (also referred to as a GDT herein).

Referring to FIG. 24, the first electrode 414 of the GDT 402 is also shown to function as one of two electrodes of a first MOV configuration 100*a* (also referred to as a MOV herein). More particularly, a metal oxide layer 412 is shown to be implemented between the first electrode 414 of the GDT 402 and a first external electrode 410, thereby providing the first MOV functionality.

Similarly, the second electrode 418 of the GDT 402 is also shown to function as one of two electrodes of a second MOV configuration 100*b* (also referred to as a MOV herein). More particularly, a metal oxide layer 420 is shown to be implemented between the second electrode 418 of the GDT 402 and a second external electrode 422, thereby providing the second MOV functionality.

As described in reference to FIG. 23, the circuit representation 400' of the GDT/MOV device 400 is depicted as including a series arrangement of the first MOV 100*a*, the GDT 402, and the second MOV 100*b*. In such a circuit representation, the first MOV 100*a* is depicted as having one of its electrodes also function as one of the electrodes of the GDT 402. Thus, in the structure shown in FIG. 24, the electrode 414 can be referred to as a first shared electrode. Similarly, the second MOV 100*b* is depicted as having one of its electrodes also function as the other of the electrodes of the GDT 402. Thus, in the structure shown in FIG. 24, the electrode 418 can be referred to as a second shared electrode.

Figure 25A:
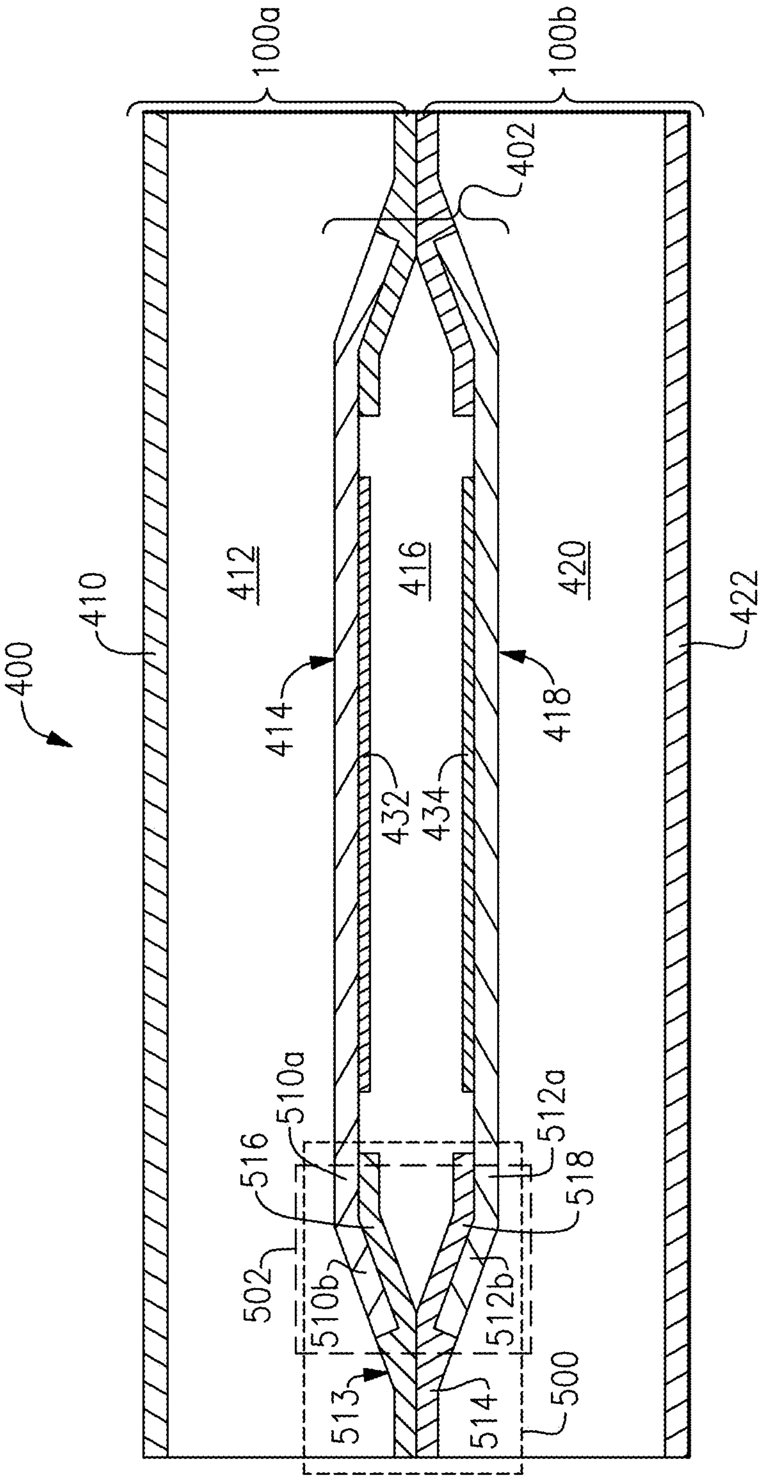
FIG. 25A shows a side sectional view of the GDT/MOV device of FIG. 24.
Figure 25B:
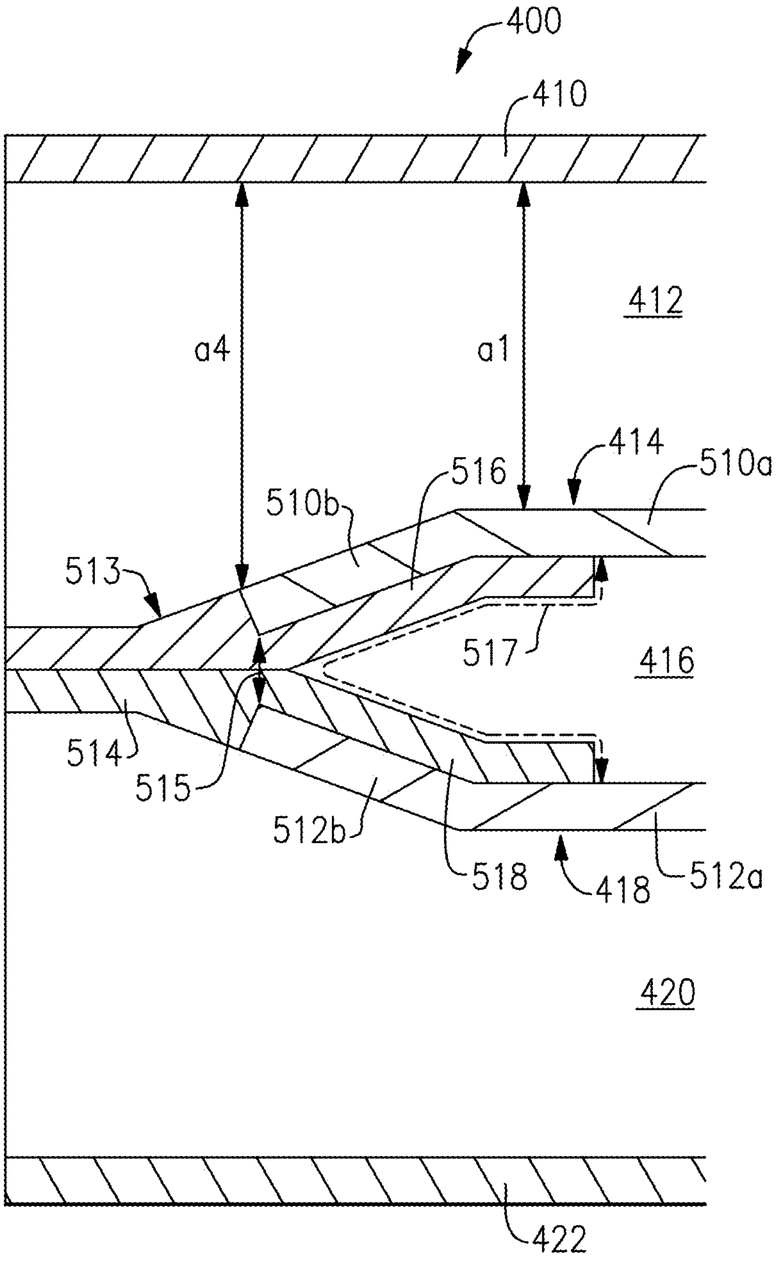
FIG. 25B shows an enlarged view of one lateral side of the side sectional view of FIG. 25A.

FIG. 24 is a perspective cutaway view of the GDT/MOV device 400. In the example of FIG. 24, the GDT/MOV device 400 is shown to include optional passivation jackets 504, 506 to prevent or reduce the likelihood of outside arcing. FIG. 25A shows a side sectional view of the GDT/MOV device 400 of FIG. 24, but without the passivation jackets (504, 506 in FIG. 24). FIG. 25B shows an enlarged view of one lateral side of the side sectional view of FIG. 25A.

Referring to FIGS. 24 and 25, and as described above, the GDT/MOV device 400 is shown to include a sealed chamber 416 having opposing sides. A first electrode 414 can be implemented on one of such opposing sides, and a second electrode 418 can be implemented on the other side, thereby providing a GDT configuration 402 (also referred to as a GDT herein).

In some embodiments, an emissive coating (432 or 434) can be provided on each of the electrodes 414, 418. Such an emissive coating can be utilized for operation of the GDT portion of the GDT/MOV device 400. It will be understood that a GDT/MOV device having one or more features as described herein may or may not include emissive coatings on electrodes.

FIGS. 24 and 25 show that in some embodiments, the GDT/MOV device 400 can include an edge configuration for some or all of its electrodes (410, 414, 418, 422). As described herein, such an edge configuration can include a flared edge of an electrode associated with a MOV, implemented to reduce MOV-related damages at or near the edge of the electrode.

Referring to FIGS. 24 and 25A, the foregoing edge configuration is generally indicated as 502, and FIG. 25B shows an enlarged view of a portion of FIG. 25A including various parts associated with the edge configuration 502. Referring to FIGS. 25A and 25B, the first shared electrode 414 is shown to include an inner portion 510*a* and an outer portion 510*b* that flares away from the first external electrode 410. Accordingly, one can see that a separation distance between the inner portion 510*a* of the first shared electrode 414 and the first external electrode 410 has a dimension a1 (in FIG. 25B), and a separation distance between the outer edge of the outer portion 510*b* of the first shared electrode 414 and the first external electrode 410 has a dimension a4 (in FIG. 25B), with a4 being greater than a1. Similarly, and assuming that the second MOV 100*b* is a substantial mirror image of the first MOV 100*a*, a separation distance between the inner portion 512*a* of the second shared electrode 418 and the external electrode 422 has a dimension a1 (in FIG. 25B), and a separation distance between the outer edge of the outer portion 512*b* of the second shared electrode 418 and the second external electrode 422 has a dimension a4 (in FIG. 25B), with a4 being greater than a1.

As described herein, the foregoing edge configuration of electrodes desirably reduces the likelihood of damages to a MOV at or near electrode edges. For example, the first MOV 100*a* can benefit from reduced likelihood of damage at or near the edge of the first shared electrode 414. Similarly, the second MOV 100*b* can benefit from reduced likelihood of damage at or near the edge of the second shared electrode 418.

Stated another way, suppose that a shared electrode of a MOV (in a similar configuration of MOV/GDT/MOV as in FIG. 25A) does not have a flared edge configuration with respect to its corresponding external electrode. Such a configuration has associated with it a failure current threshold that leads to an edge failure mode. By providing a flared edge configuration as described herein, such an edge failure mode can be substantially eliminated or reduced, and the failure current threshold can be raised to another failure mode (which may or may not involve an edge failure).

In the example of FIGS. 24 and 25, the outer portion of each of the first and second shared electrodes 414, 418 is depicted as having a straight section profile when viewed in a side sectional view such as in FIGS. 25A and 25B. It will be understood that in some embodiments, and as described herein, the outer portion of each of the first and second shared electrodes 414, 418 can have a different shaped profile, including a curved profile.

In the example of FIGS. 24 and 25, each of the first and second MOVs 100*a*, 100*b* is configured so that the respective shared electrode (414 or 418) provides a flared edge configuration while the respective external electrode (410 or 422) has a planar configuration without a flared edge portion. It will be understood that in some embodiments, each of the first and second MOVs 100*a*, 100*b* can have respective electrodes configured differently to provide a desired edge configuration.

For example, each of the first and second external electrodes 410, 422 may also be provided with a flared edge portion, such that both electrodes of each MOV have flared edge portions. In another example, each of the first and second external electrodes 410, 422 can be provided with a flared edge portion, and each of the first and second shared electrodes 414, 418 can have a planar configuration without a flared edge portion.

FIGS. 24 and 25 show that in some embodiments, the GDT/MOV device 400 can include an edge region generally indicated as 500 or 415. Such an edge region of the GDT/MOV device 400 can include a shaped edge portion for each of the metal oxide layers 412, 420 dimensioned to accommodate the flared edge configuration of the respective shared electrode (414 or 418). Examples of how such a shaped edge portion can be formed are described herein in greater detail.

As shown in FIGS. 24 and 25, the edge region 500 of the GDT/MOV device 400 can further include a seal 513 implemented to join the perimeter portions of the first and second metal oxide layers 412, 420. In some embodiments, such a seal can be an electrically insulating seal, such as a glass seal.

In some embodiments, the edge region 500 of the GDT/MOV device 400 can further include a seal assembly that includes a spacer (e.g., a washer shaped spacer) with a glass seal that joins each side of the spacer to the perimeter portion of the respective metal oxide layer (412 or 420). Additional details concerning such a spacer are disclosed in the above-referenced International Publication No. WO 2020/047381.

In some embodiments, the seal 513 (e.g., a glass seal) can be configured to extend from the outer edge of the GDT/MOV device 400 and inward to a location at least between the edges of the outer portions 510*b*, 512*b* of the first and second shared electrodes 414, 418. Configured in such a manner, the seal 513 can provide a sealing portion 514 that provides a sealing functionality for the GDT chamber 416, and to provide a desired dielectric property between the edges of the outer portions 510*b*, 512*b* of the first and second shared electrodes 414, 418.

With respect to the sealing portion 514 providing the foregoing desired dielectric property, it is noted that in the example of FIGS. 24 and 25, the flared edge configuration of each of the first and second shared electrodes 414, 418 results in one shared electrode to have its edge being closer to the edge of the other shared electrode when compared to the separation distance of the inner portions 510*a*, 512*a* of the shared electrodes 414, 418. In FIG. 25B, such a closer distance between the edges is depicted as an arrow 515. While such a closer distance (515) can increase the likelihood of an electrical breakdown event between the edges of the outer portions 510*b*, 512*b* of the shared electrodes 414, 418, the presence of the sealing portion 514 can provide a higher dielectric strength (e.g., higher than dielectric strength of a gas in the GDT chamber 416) to reduce the likelihood of such a breakdown event. For example, if glass is utilized as the sealing portion 514, such glass material can provide a dielectric strength value that is greater than 10 MV/m, while a gas typically has lower dielectric strength value.

In some embodiments, and as shown in FIGS. 24 and 25, the seal 513 can be configured to extend inward beyond the location between the edges of the outer portions 510*b*, 512*b* of the first and second shared electrodes 414, 418. In the example shown in FIGS. 24 and 25, such an extension of the seal 513 is indicated as 516 on the side of the first shared electrode 414, and as 518 on the side of the second shared electrode 418. Each of such seal extensions 516, 518 may also be referred to herein an inward insulating wing.

In some embodiments, each of the seal extensions 516, 518 can extend inward to cover some or all of the respective outer portion (510*b* or 512*b*). In some embodiments, each of the seal extensions 516, 518 can extend inward to cover substantially all of the respective outer portion (510*b* or 512*b*), and some of the respective inner portion (510*a* or 512*a*) of the respective shared electrode (414 or 418).

In some embodiments, the seal extensions (or inward insulating wings) 516, 518 can be dimensioned to provide an extended leakage path between the first and second shared electrodes 414, 418. It is noted that in a GDT, a leakage current can exist between the electrodes. Such a leakage current typically follows a leakage path along various surfaces of the sealed chamber, from one electrode to the other electrode. In many GDT applications, it is desirable to have such a leakage current reduced. To achieve such a reduction in leakage current, the corresponding leakage path can be increased.

In the example shown in FIG. 25B, a leakage path between the first and second shared electrodes 414, 418 is depicted as 517. In the example shown, such a leakage path includes a sum of surface path length of the first inward insulating wing 516 and the surface path length of the second inward insulating wing 518. It is noted that if the first and second inward insulating wings 516, 518 are absent (such that the seal 513 ends at or near the edges of the outer portions 510*b*, 512*b* of the electrodes 414, 418, the corresponding leakage path will be similar to the dimension of the edge gap distance 515. Accordingly, one can see that the first and second inward insulating wings 516, 518 can provide a significant increase in leakage path length for a given separation arrangement of the first and second shared electrodes 414, 418.

Among others, International Publication No. WO 2020/257532 (International Application No. PCT/US2020/038552 titled GAS DISCHARGE TUBE HAVING ENHANCED RATIO OF LEAKAGE PATH LENGTH TO GAP DIMENSION) which is expressly incorporated by reference in its entirely and its disclosure is to be considered part of the specification of the present application discloses additional details related to the foregoing feature of increased leakage path length.

Figure 26A:
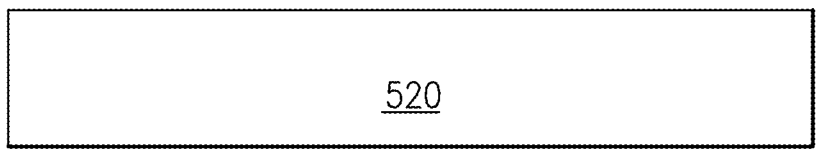
FIGS. 26A to 26G show an example process that can be implemented to fabricate the GDT/MOV device of FIGS. 24 and 25.

FIGS. 26A-26G show an example process that can be implemented to fabricate the GDT/MOV device 400 of FIGS. 24 and 25. FIG. 26A shows that in some embodiments, a metal oxide layer 520 can be provided or formed. In some embodiments, such a metal oxide layer can be utilized as the first metal oxide layer 412 or the second metal oxide layer 420 of FIGS. 24 and 25.

Figure 26B:
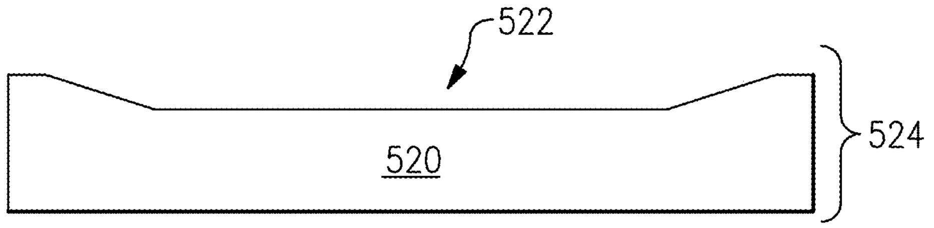

In a process step of FIG. 26B, a shaped depression 522 can be formed on one side of the metal oxide layer 520, so as to yield an assembly 524. Examples of how such a shaped depression can be formed are described herein in reference to FIGS. 13A to 13D.

Figure 26C:
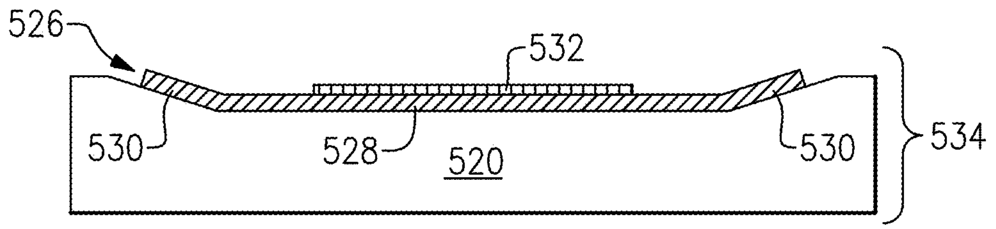

In a process step of FIG. 26C, an electrode 526 can be formed on the metal oxide 520 so as to partially or fully cover the shaped depression (522 in FIG. 26B), so as to yield an assembly 534. In some embodiments, such an assembly can further include an emissive coating 532 formed on a laterally inner portion of the electrode 526. It will be understood that in some embodiments, the emissive coating 532 may or may not be the utilized. It is noted that the electrode 526 includes an inner portion 528 and an outer portion 530 implemented as described herein.

In some embodiments, the electrode 526 in FIG. 26C can be formed with, for example, silver, copper, tungsten, silver overplated with nickel or tin, etc. Formation of such an electrode can be achieved by, for example, screen printing, pad printing, or evaporation/photo-etch techniques, etc.

Figure 26D:
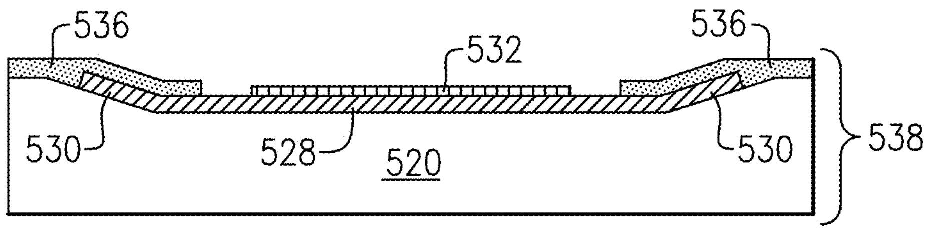

In a process step of FIG. 26D, a layer 536 of sealing material can be formed on the perimeter portion of the assembly 534, so as to form an assembly 538. In some embodiments, such a sealing material can be an electrically insulating material such as an insulative sealing glass or other high temperature insulative sealing material. In some embodiments, the sealing material layer 536 can be dimensioned to provide one or more functionalities described herein in reference to FIGS. 24 and 25 when the assembly 538 is assembled with another similar assembly.

Figure 26E:
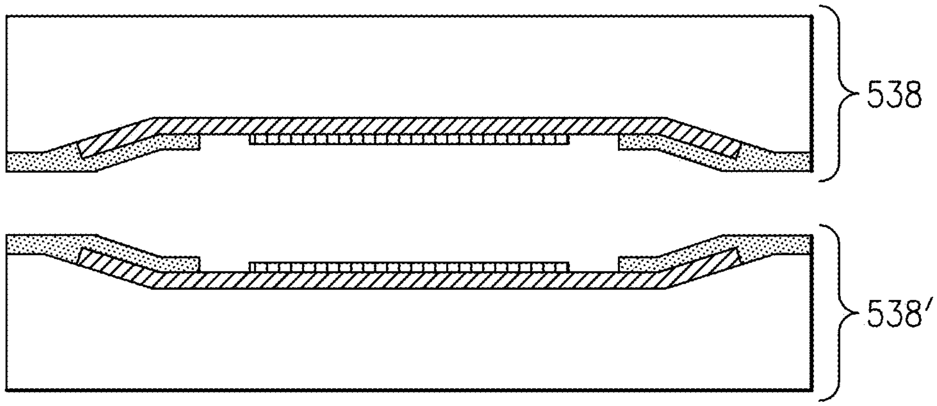

In a process step of FIG. 26E, two of the assemblies 538 of FIG. 26D can be assembled to allow joining of the inner facing portions of the two assemblies (538, 538'). More particularly, a first assembly 538 (similar to the assembly 538 of FIG. 26D) can be inverted and positioned over a second assembly 538' (also similar to the assembly 538 of FIG. 26D).

Figure 26F:
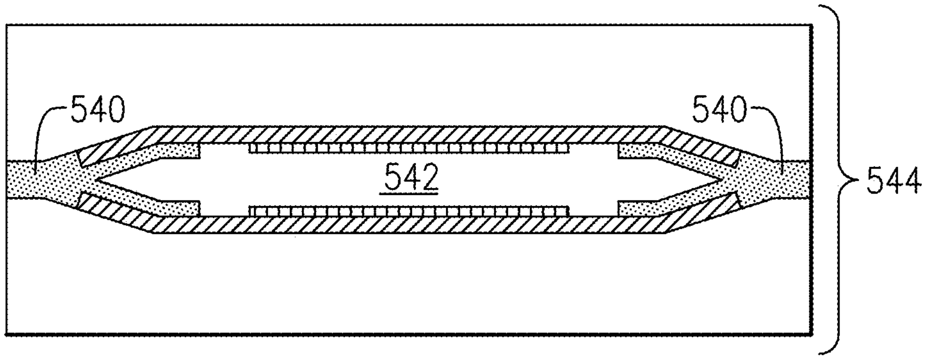

In a process step of FIG. 26F, the assembly (538 and 538') of FIG. 26E can be further processed to form a seal 540 and a corresponding sealed chamber 542, so as to form an assembly 544. By way of an example, such further processing can include providing a desired gas (e.g., inert gas, active gas, or some combination thereof) so that the unsealed chamber becomes filled with the gas. Then, the assembly (538 and 538') can be heated so that the sealing layers (536 in FIG. 26D) fuse to form the seal 540 and the sealed chamber 542 with the desired gas therein.

Figure 26G:
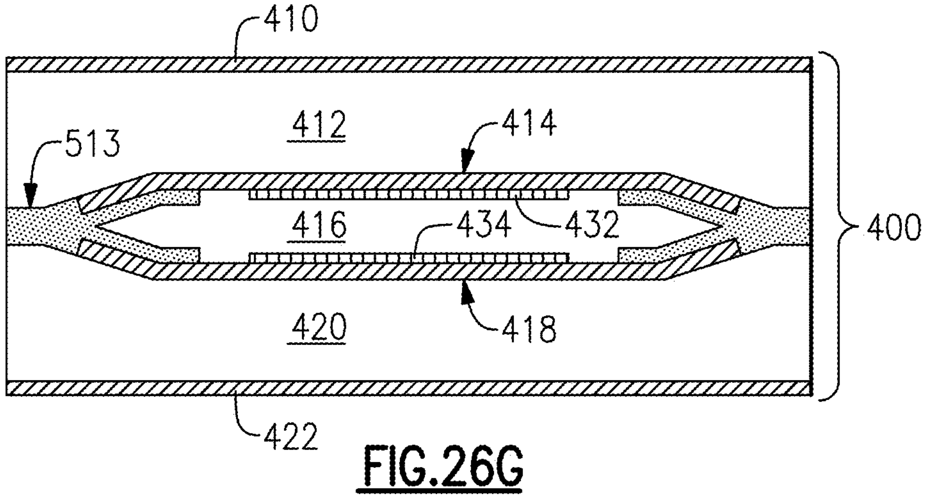

In a process step of FIG. 26G, first and second external electrodes 410, 422 can be formed on the assembly 544 of FIG. 26F, so as to form an assembly 400 that is similar to the GDT/MOV device 400 of FIGS. 24 and 25. More particularly, the first external electrode 410 can be formed on the outer facing surface of the first metal oxide layer 412, and the second external electrode 422 can be formed on the outer facing surface of the second metal oxide layer 420.

It will be understood that in some embodiments, order of the example process steps depicted in FIGS. 26A to 26G can be varied. For example, the external electrodes 410 and 422 (formed in the process step of FIG. 26G) may be formed before a sealing process step (e.g., in the same step as or in addition to the process step of FIG. 26C where the electrode 526 (414 and 418 in FIG. 26G) is formed).

In the example process of FIGS. 26A to 26G, fabrication of one GDT/MOV device is depicted. In some embodiments, a plurality of GDT/MOV devices can be fabricated in an array format, and such devices can be singulated into a plurality of individual devices. FIGS. 27A-27H show an example of such a fabrication process where at least some of process steps are performed while a plurality of units are attached in an array format.

Figures 27A, 27B, 27C, 27D:
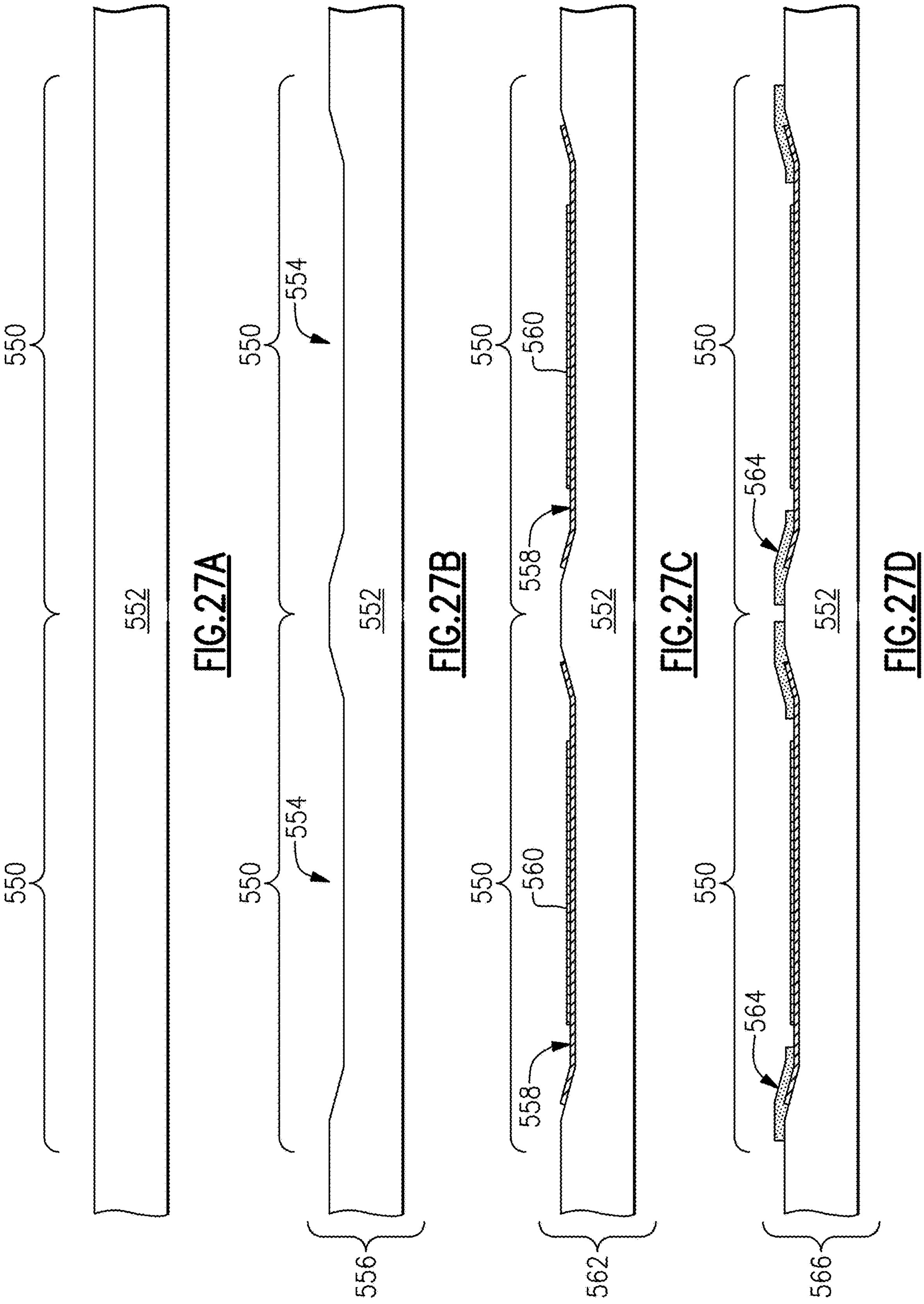
FIGS. 27A to 27H show an example process that can be implemented to fabricate a plurality of GDT/MOV devices, where at least some of process steps are performed while a plurality of units are attached in an array format.

For example, FIG. 27A shows a process step where a plate of metal oxide 552 can be provided or formed. Such a plate is shown to include a plurality of units 550 where each unit will eventually become a GDT/MOV device.

In a process step of FIG. 27B, a shaped depression 554 can be formed on one side of the metal oxide 552 for each unit 550, so as to form an assembly 556. In some embodiments, each of such shaped depressions can be formed as described herein in reference to FIG. 26B.

In a process step of FIG. 27C, an electrode 558 can be formed on the metal oxide 552 so as to partially or fully cover the shaped depression (554 in FIG. 27B) for each unit 550, so as to form an assembly 562. In some embodiments, each of such electrodes can be formed as described herein in reference to FIG. 26C. In some embodiments, such an assembly can further include an emissive coating 560 formed on a laterally inner portion of the corresponding electrode 558. It will be understood that in some embodiments, the emissive coating 560 may or may not be the utilized. It is noted that the electrode 558 includes an inner portion and an outer portion implemented as described herein.

In a process step of FIG. 27D, a layer 564 of sealing material can be formed on the perimeter portion of each unit 550 of the assembly 562, so as to form an assembly 566. In some embodiments, each of such sealing layers 564 can be formed as described herein in reference to FIG. 26D.

Figure 27E:
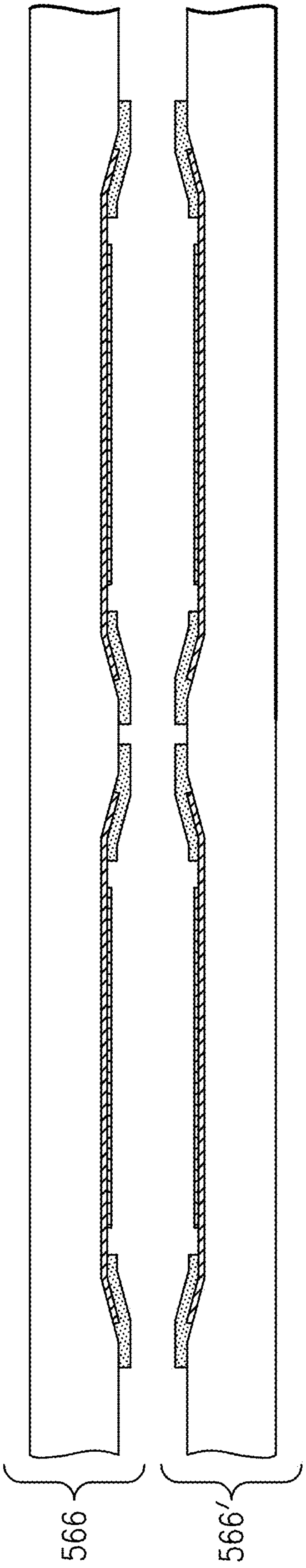

In a process step of FIG. 27E, two of the assemblies 566 of FIG. 27D can be assembled to allow joining of the inner facing portions of the two assemblies (566, 566'). More particularly, a first assembly 566 (similar to the assembly 566 of FIG. 27D) can be inverted and positioned over a second assembly 566' (also similar to the assembly 566 of FIG. 27D).

Figure 27F:
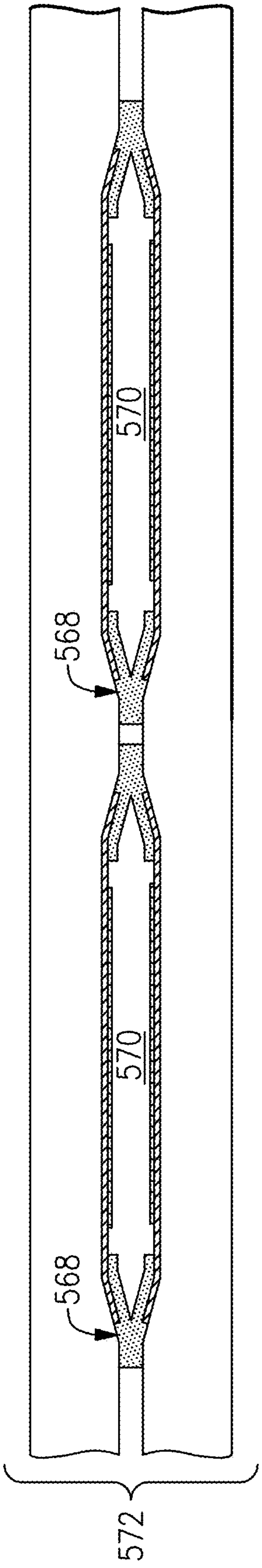

In a process step of FIG. 27F, the assembly (566 and 566') of FIG. 27E can be further processed to form a seal 568 and a corresponding sealed chamber 570 for each unit, so as to form an assembly 572. In some embodiments, such further processing can be achieved as described herein in reference to FIG. 26F.

Figure 27G:
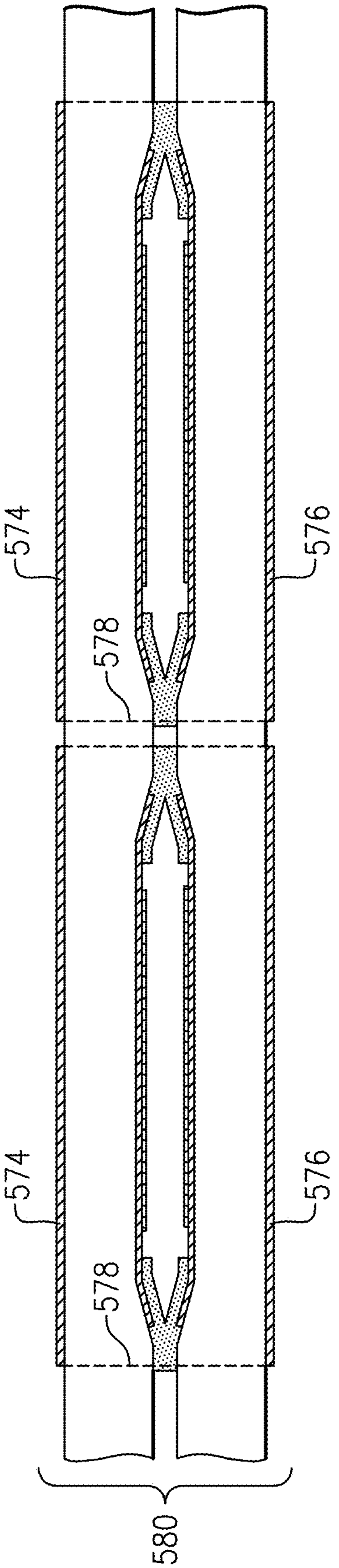

In a process step of FIG. 27G, first and second external electrodes 574, 576 can be formed for each unit on the assembly 572 of FIG. 27F, so as to form an assembly 580. In some embodiments, such external electrodes can be dimensioned laterally to allow singulation of the units along singulation lines 578.

Figure 27H:
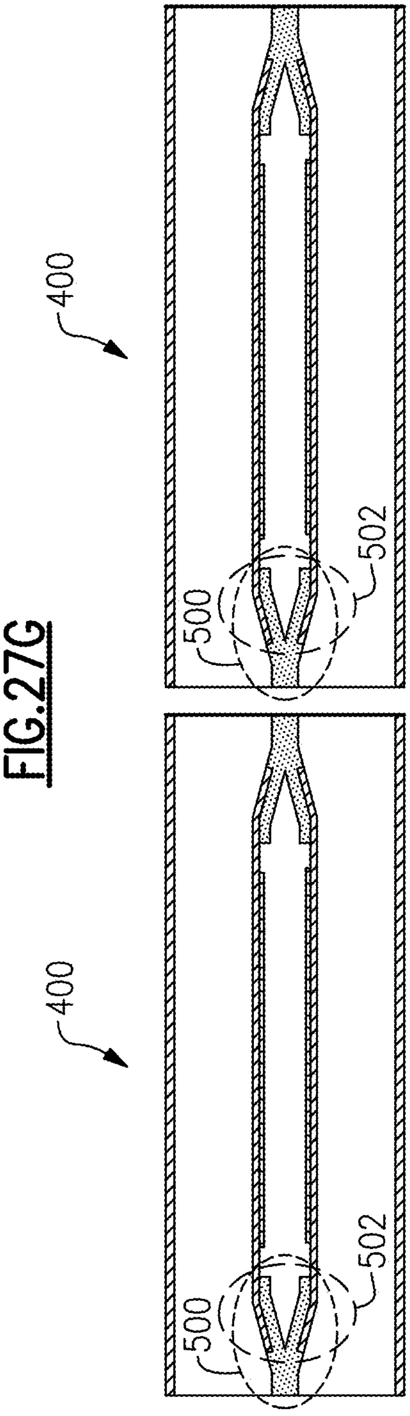

In a process step of FIG. 27H, the plurality of units of the assembly 580 of FIG. 27G can be singulated to yield a plurality of individual GDT/MOV devices 400, with each being similar to the GDT/MOV device 400 of FIGS. 24 and 25. As described herein, each of such GDT/MOV devices 400 can include an electrode edge configuration 502 as described herein and/or an edge configuration 500 as described herein.

It will be understood that in some embodiments, order of the example process steps depicted in FIGS. 27A to 27H can be varied. For example, the external electrodes 574 and 576 (formed in the process step of FIG. 27G) may be formed before a sealing process step (e.g., in the same step as or in addition to the process step of FIG. 27C where the electrodes 558 (414 and 418 in FIG. 26G) are formed).

Figure 28:
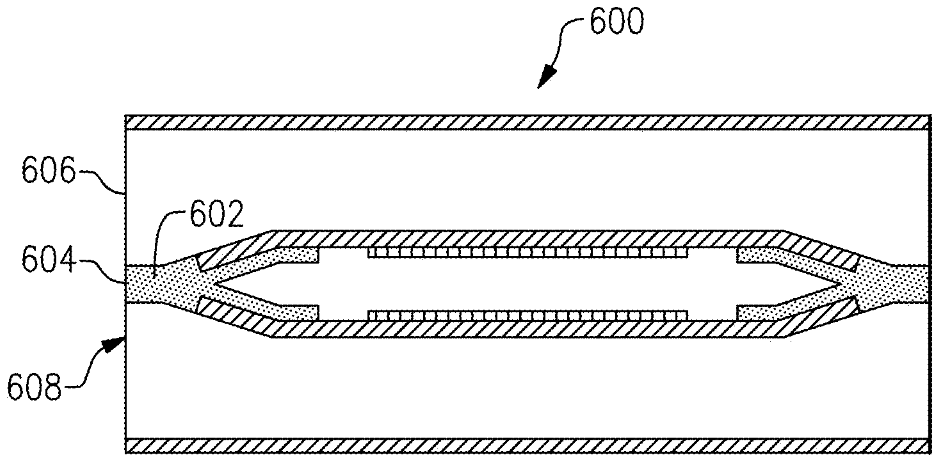
FIG. 28 shows a side sectional view of a GDT/MOV device having one or more features as described herein, where first and second metal oxide layers are joined together with a seal to define an outer wall.

FIG. 28 shows a GDT/MOV device 600 that is similar to the GDT/MOV device 400 of FIGS. 24 and 25. In the example of FIG. 28, the GDT/MOV device 600 is shown to include a side wall 606 defined by side walls the two metal oxide layers (412, 420 in FIGS. 24 and 25), and a side profile 604 of a sealing portion 602 (514 in FIGS. 24 and 25). In some implementations, it is preferable to have the side profile 604 of the sealing portion 602 not protrude outward beyond the side wall 606. In such a configuration, the GDT/MOV device 600 is shown to have a side profile 608 where the side profile 604 of the sealing portion 602 does not protrude outward beyond the side wall 606.

Figure 29:
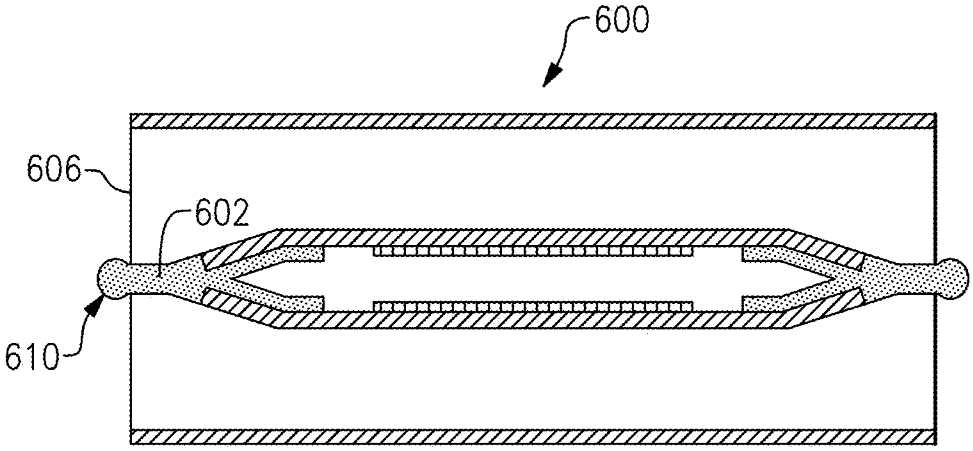
FIG. 29 shows that in some situations, material associated with the seal of the GDT/MOV device of FIG. 28 can protrude outward from the outer wall.

FIG. 29 shows that in some situations, a side profile of the sealing portion 602 can protrude outward beyond the side wall 606. For example, excess sealing material such as glass can form a bead 610 that protrudes outward beyond the side wall 606. Formation of such a bead can occur during, for example, a sealing process (e.g., during one or more of the process steps of FIGS. 26E to 26G).

In some situations, such a protruding bead can result in undesirable issues during one or more processing steps. For example, the protruding bead can cause the corresponding assembly to undesirably stick to an alignment fixture during a process step subsequent to the bead-forming process step. In another example the protruding bead can undesirably transmit an external force to the corresponding assembly during a process step subsequent to the bead-forming process step, thereby resulting in the corresponding GDT/MOV device 600 of FIG. 29 being more fragile during production.

Figure 30A:
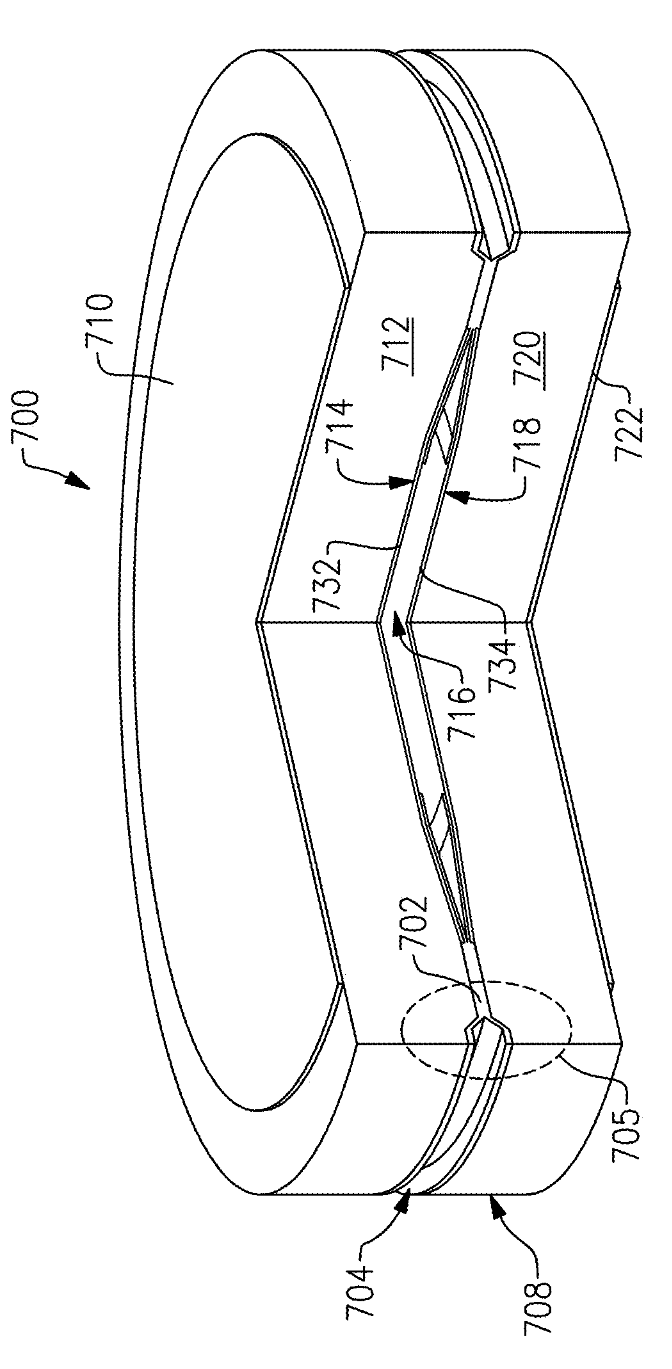
FIG. 30A shows a perspective cutaway view of a GDT/MOV device having an edge configuration that can eliminate or reduce the outward protrusion of a seal material.
Figure 30B:
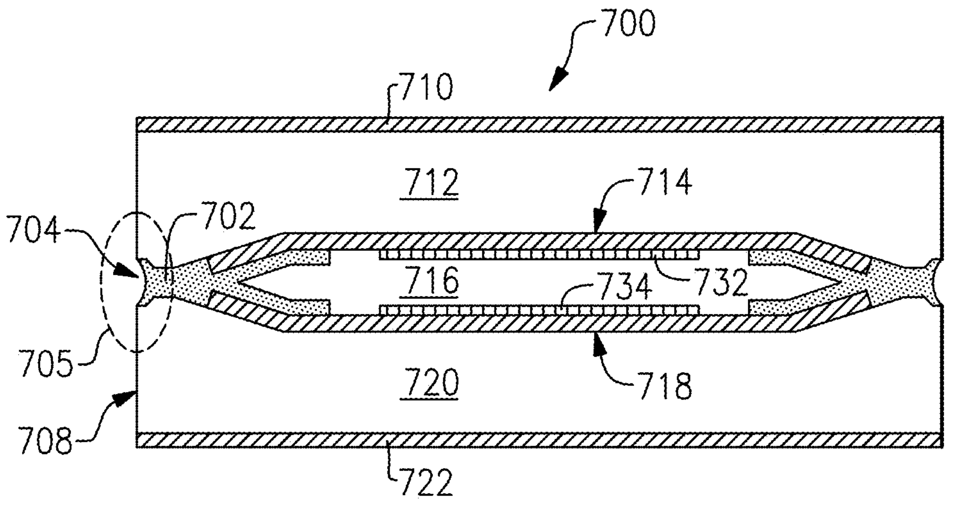
FIG. 30B shows a side sectional view of the GDT/MOV device of FIG. 30A.
Figure 31A:
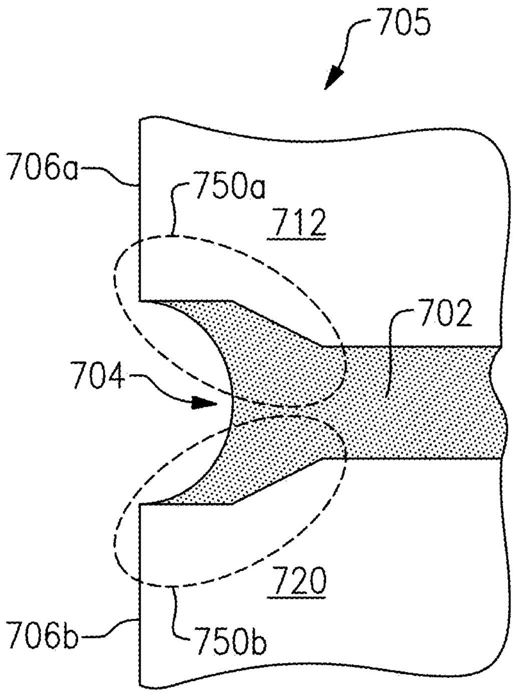
FIG. 31A shows an enlarged view of an example of an outer edge portion of the GDT/MOV device of FIG. 30B.
Figure 31B:
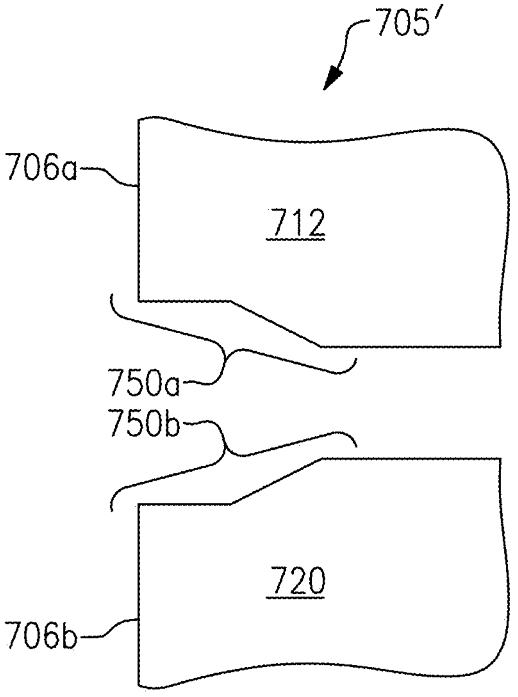
FIG. 31B shows the example outer edge portion of FIG. 31A without the seal material.

FIGS. 30A and 30B show that in some embodiments, a GDT/MOV device 700 can include an edge portion 705 configured to provide a volume that can allow excess sealing material of a sealing portion 702 to collect therein. FIG. 31A shows an enlarged view of the edge portion 705, and FIG. 31B shows the same enlarged view of the edge portion (705') without the sealing portion (702 in FIG. 31A).

Referring to FIGS. 30A, 30B, 31A and 31B, the example GDT/MOV device 700 is shown to be similar to the example GDT/MOV devices 400, 600 of FIGS. 24, 25 and 28, except that the GDT/MOV device 700 (of FIGS. 30A, 30B, 31A and 31B) is shown to include an edge profile (750*a*, 750*b*) for each of first and second metal oxide layers 712, 720. In some embodiments, such edge profiles of the first and second metal oxide layers 712, 720 can be dimensioned to accommodate any excess sealing material that may exist when the sealing portion 702 is formed to join the first and second metal oxide layers 712, 720.

In some embodiments, the edge profiles 750*a*, 750*b* accommodating the excess sealing material can result in a side profile 704 of the sealing portion 702 that does not protrude outward beyond a side wall 708 of the GDT/MOV device 700 defined by side walls 706*a*, 706*b* of the first and second metal oxide layers 712, 720. For example, in FIGS. 30A, 30B and 31A, the side profile 704 of the sealing portion 702 is depicted as having a concave profile that does not protrude outward beyond the side wall 708. In another example, a side profile (704) of the sealing portion 702 can be substantially flush with the side walls 706*a*, 706*b* of the first and second metal oxide layers 712, 720.

It is noted that other parts of the GDT/MOV device 700 (of FIGS. 30A, 30B, 31A and 31B) such as electrodes 710, 714, 718, 722, emissive coatings 732, 734 and sealed chamber 716 can be similar to their counterparts in the GDT/MOV devices 400, 600 of FIGS. 24, 25 and 28.

In some embodiments, an edge profile of a metal oxide layer for providing a volume for at least some of excess sealing material of a sealing portion can be implemented as a chamfer edge, a groove edge, and the like. For example, and referring to FIG. 31B, each of the first and second metal oxide layers 712, 720 is shown to have an edge profile (750*a* or 750*b*) implemented as a groove edge formed with two straight segments. Such a groove edge with two straight segments is also shown in FIG. 32A, where the edge profile 750*a* of the first metal oxide layer 712 is shown to include first and second straight segments 752*a*, 754*a* forming the groove edge, and the edge profile 750*b* of the second metal oxide layer 720 is shown to include first and second straight segments 752*b*, 754*b* forming the groove edge.

Figure 32A:
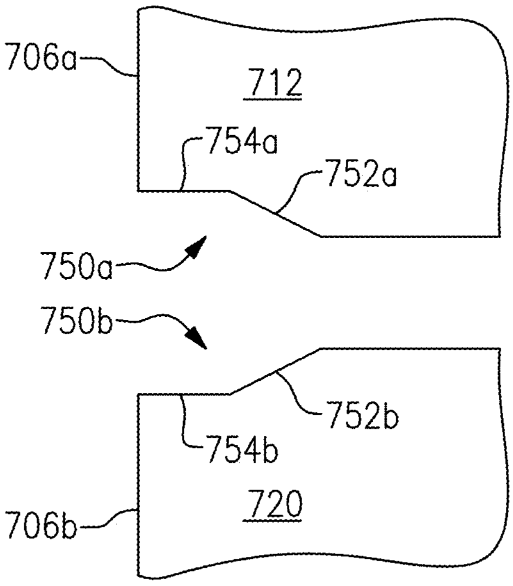
FIGS. 32A to 32F show non-limiting examples of an edge configuration of a GDT/MOV device that can eliminate or reduce an outward protrusion of a seal material.
Figure 32B:
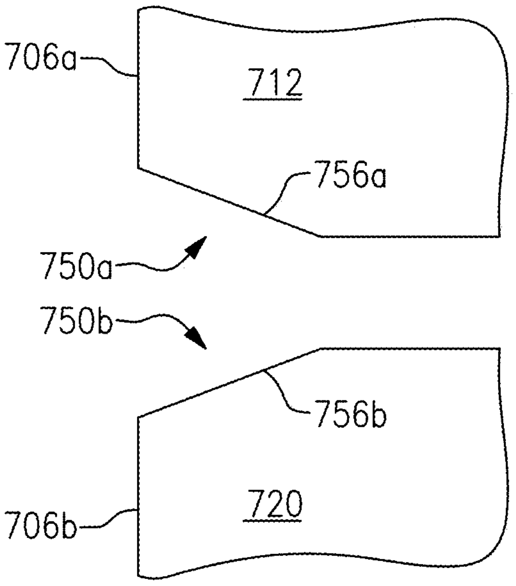

FIG. 32B shows an example where each of the first and second metal oxide layers 712, 720 has an edge profile (750*a* or 750*b*) implemented as a chamfer edge. More particularly, a straight segment 756*a* is shown to form a chamfer edge for the edge profile 750*a*, and a straight segment 756*b* is shown to form a chamfer edge for the edge profile 750*b*.

Figure 32C:
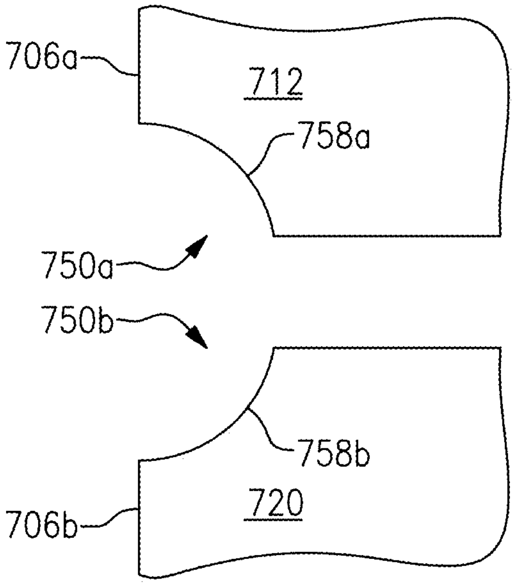

FIG. 32C shows an example where each of the first and second metal oxide layers 712, 720 has an edge profile (750*a* or 750*b*) implemented as a curve groove edge. More particularly, a curve 758*a* is shown to form a groove edge for the edge profile 750*a*, and a curve 758*b* is shown to form a groove edge for the edge profile 750*b*.

Figure 32D:
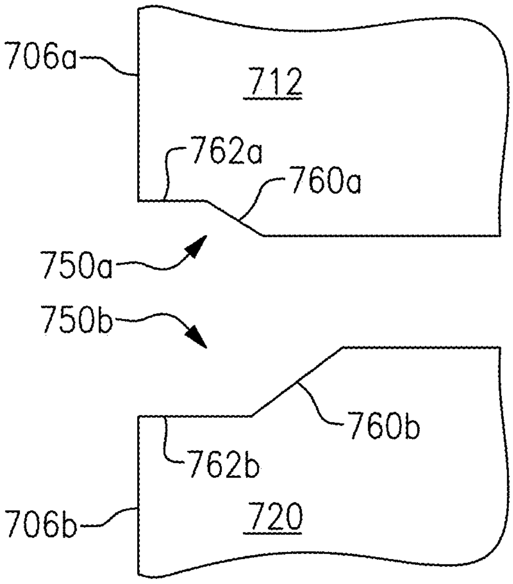
Figure 32E:
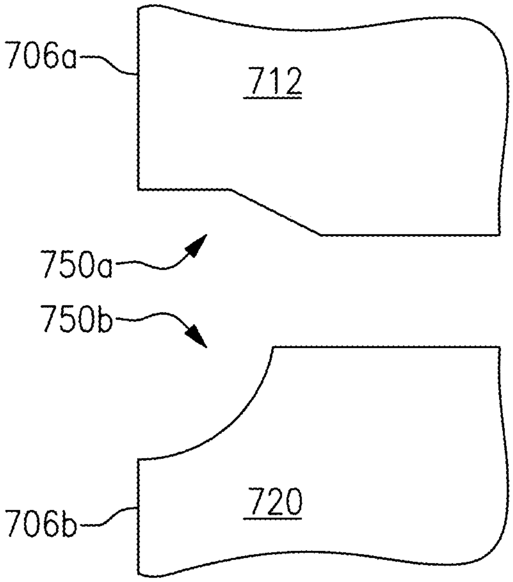
Figure 32F:
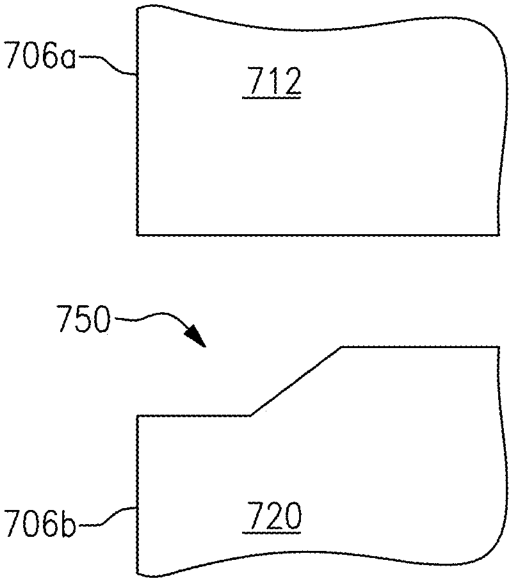

FIGS. 32A to 32C show non-limiting examples of edge profiles 750*a*, 750*b* that are mirror images of each other, and thus symmetric about a mid-plane between the first and second metal oxide layers 712, 720. It will be understood that a GDT/MOV device having one or more features as described herein can include edge profiles (of first and second metal oxide layers) that are not symmetric. FIGS. 32D to 32F show non-limiting examples of such edge profiles that are not symmetric.

For example, FIG. 32D shows a configuration where first and second edge profiles 750*a*, 750*b* are implemented as similar type of edge geometry (e.g., a first groove edge formed with two straight segments 760*a*, 762*a*, and a second groove edge formed with two straight segments 760*b*, 762*b*). However, the two edge profiles 750*a*, 750*b* are dimensioned differently, thereby resulting in the edge profile asymmetry.

In another example, FIG. 32E shows a configuration where first and second edge profiles 750*a*, 750*b* are implemented with different types of edge geometries (e.g., a groove edge with two straight segments for the first metal oxide layer 712, and a curve groove edge for the second metal oxide layer 720). Accordingly, the two edge profiles 750*a*, 750*b* are not symmetric with each other.

In yet another example, FIG. 32F shows a configuration where first and second edge profiles 750*a*, 750*b* are implemented with different types of edge geometries (e.g., a right-angle edge for the first metal oxide layer 712, and a groove edge for the second metal oxide layer 720). Accordingly, the two edge profiles 750*a*, 750*b* are not symmetric with each other.

FIGS. 32A to 32F also show that in some embodiments, an edge portion (e.g., 750 in FIGS. 30A, 30B and 31A) of a GDT/MOV device 700 can include a volume-providing feature (e.g., a chamfer edge, a groove edge, and the like) implemented for each of either or both of the first and second metal oxide layers 712, 720. More particularly, FIGS. 32A to 32E are examples where a volume-providing feature is implemented for each of both of the first and second metal oxide layers 712, 720; and FIG. 32F is an example where a volume-providing feature is implemented for only one of the first and second metal oxide layers 712, 720.

Figure 33A:
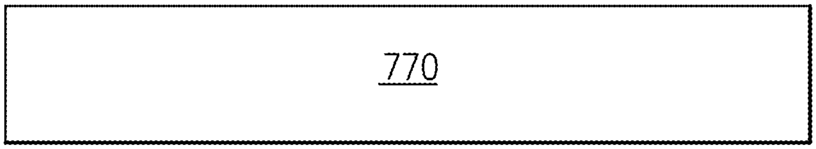
FIGS. 33A to 33G show an example process that can be implemented to fabricate the GDT/MOV device of FIGS. 30A and 30B.

FIGS. 33A-33G show an example process that can be implemented to fabricate the GDT/MOV device 700 of FIGS. 30A and 30B. FIG. 33A shows that in some embodiments, a metal oxide layer 770 can be provided or formed. In some embodiments, such a metal oxide layer can be utilized as the first metal oxide layer 712 or the second metal oxide layer 720 of FIGS. 30A and 30B.

Figure 33B:
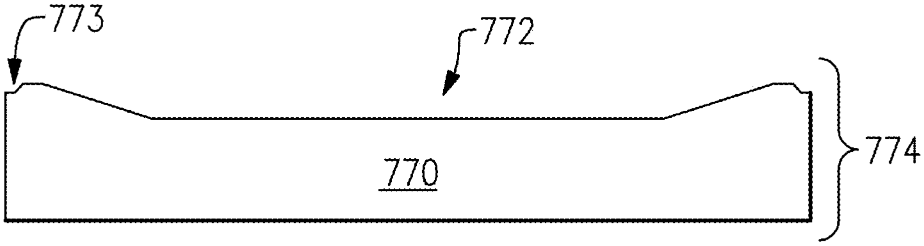

In a process step of FIG. 33B, a shaped depression 772 and a volume-providing edge feature 773 can be formed on one side of the metal oxide layer 770, so as to yield an assembly 774. In some embodiments, the volume-providing edge feature 773 can be implemented as, for example, a chamfer edge, a groove edge, and the like.

Figure 33C:
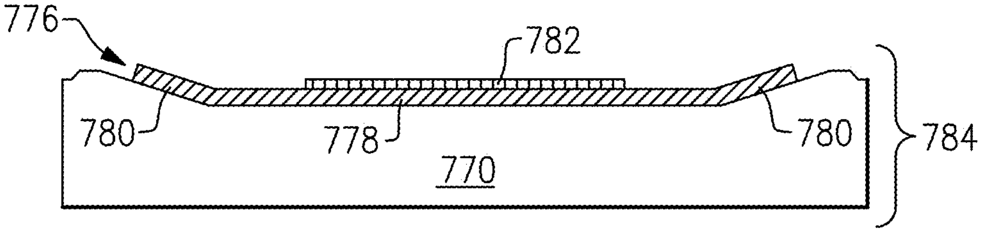

In a process step of FIG. 33C, an electrode 776 can be formed on the metal oxide 770 so as to partially or fully cover the shaped depression (772 in FIG. 33B), so as to yield an assembly 784. In some embodiments, such an assembly can further include an emissive coating 782 formed on a laterally inner portion of the electrode 776. It will be understood that in some embodiments, the emissive coating 782 may or may not be the utilized. In some embodiments, the electrode 776 can include an inner portion 778 and an outer portion 780 implemented as described herein. In some embodiments, the electrode 776 in FIG. 33C can be formed with, for example, silver, copper, tungsten, silver overplated with nickel or tin, etc. Formation of such an electrode can be achieved by, for example, screen printing, pad printing, or evaporation/photo-etch techniques, etc.

Figure 33D:
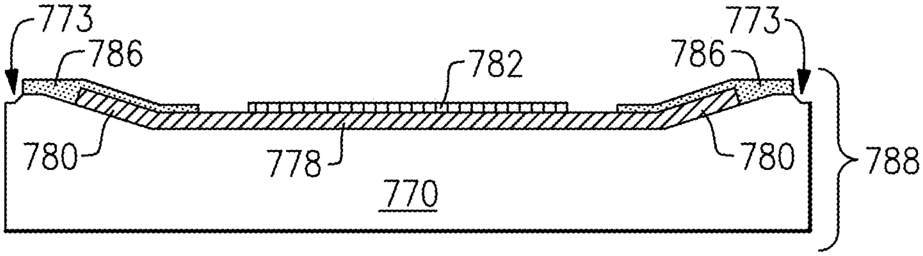

In a process step of FIG. 33D, a layer 786 of sealing material can be formed on the perimeter portion of the assembly 784, so as to form an assembly 788. In some embodiments, such a sealing material can be an electrically insulating material such as an insulative sealing glass or other high temperature insulative sealing material. In some embodiments, the sealing material layer 786 can be dimensioned to provide one or more functionalities described herein in reference to FIGS. 30A and 30B when the assembly 788 is assembled with another similar assembly. In some embodiments, the sealing material layer 786 can be implemented such that its outer edge is at or near the inner portion of the volume-providing edge feature 773.

Figure 33E:
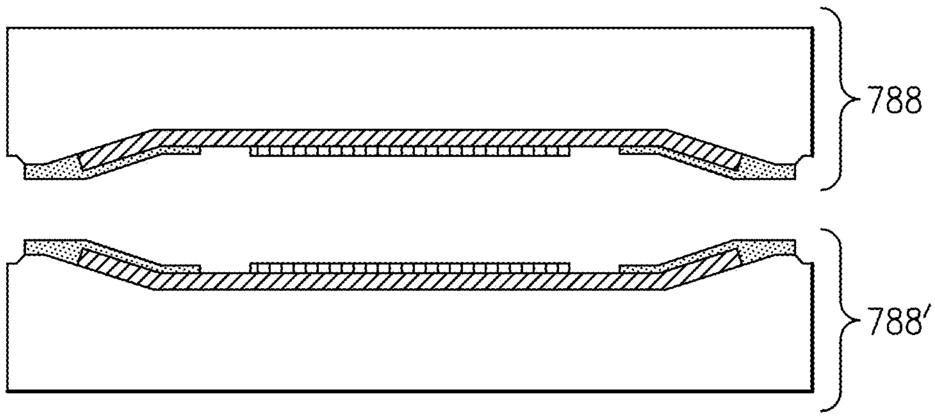

In a process step of FIG. 33E, two of the assemblies 788 of FIG. 33D can be assembled to allow joining of the inner facing portions of the two assemblies (788, 788'). More particularly, a first assembly 788 (similar to the assembly 788 of FIG. 33D) can be inverted and positioned over a second assembly 788' (also similar to the assembly 788 of FIG. 33D).

Figure 33F:
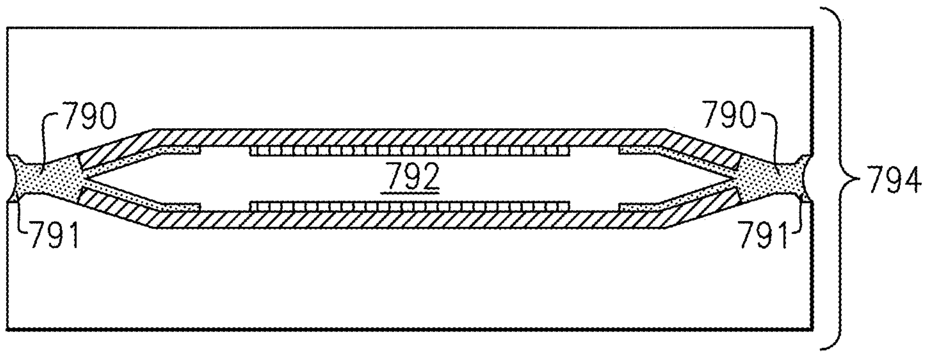

In a process step of FIG. 33F, the assembly (788 and 788') of FIG. 33E can be further processed to form a seal 790 and a corresponding sealed chamber 792, so as to form an assembly 794. By way of an example, such further processing can include providing a desired gas (e.g., inert gas, active gas, or some combination thereof) so that the unsealed chamber becomes filled with the gas. Then, the assembly (788 and 788') can be heated so that the sealing layers (786 in FIG. 33D) fuse to form the seal 790 and the sealed chamber 792 with the desired gas therein. As described herein, the presence of the volume-providing edge feature (773 in FIG. 33D) a space to accommodate any excess sealing material of the seal 790 resulting from the sealing process step of FIG. 33F. Accordingly, the resulting seal 790 has an outer edge profile 791 that does not protrude beyond the outer wall of the assembly 794 defined by the walls of the first and second metal oxide layers.

Figure 33G:
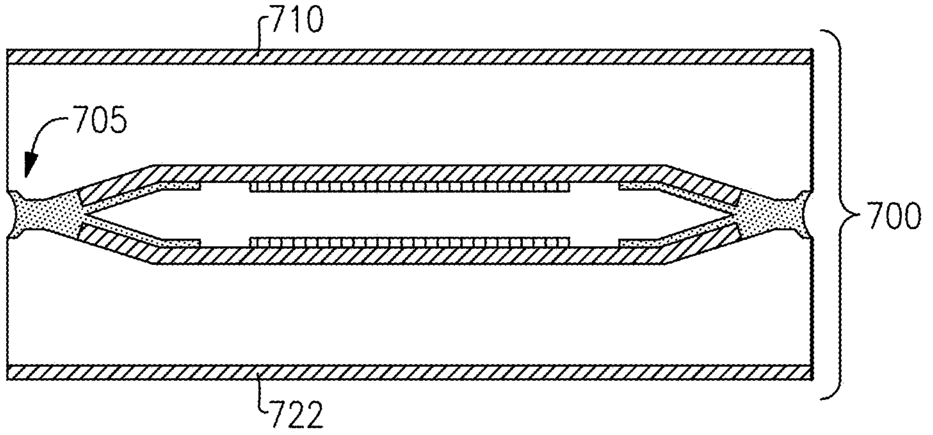

In a process step of FIG. 33G, first and second external electrodes 710, 722 can be formed on the assembly 794 of FIG. 33F, so as to form an assembly 700 that is similar to the GDT/MOV device 700 of FIGS. 30A and 30B. As described herein, such a GDT/MOV device 700 includes an edge portion 705 where the sealing material of the seal (790 in FIG. 33E) does not protrude outward beyond the outer wall of the GDT/MOV device 700.

It will be understood that in some embodiments, order of the example process steps depicted in FIGS. 33A to 33G can be varied. For example, the external electrodes 710 and 722 (formed in the process step of FIG. 33G) may be formed before a sealing process step (e.g., in the same step as or in addition to the process step of FIG. 33C where the electrode 776 (714 and 718 in FIG. 30B) is formed).

In the example process of FIGS. 33A to 33G, fabrication of one GDT/MOV device is depicted. In some embodiments, a plurality of GDT/MOV devices can be fabricated in an array format, and such devices can be singulated into a plurality of individual devices. For example, FIGS. 27A to 27H show an example of such a fabrication process where at least some of process steps are performed while a plurality of units are attached in an array format.

In some embodiments, a fabrication process similar to the example of FIGS. 27A to 27H can be modified appropriately to incorporate a volume-providing edge feature (e.g., 773 in FIGS. 33B and 33D) for each unit, and therefore benefit from its functionality when a sealing process step is performed. In some embodiments, a singulation process step such as the process step of FIG. 27H can be performed such that singulation occurs along a line or region between volume-providing edge features of neighboring units.

In the various examples described in reference to FIGS. 30 to 33, sealing material of a seal can be glass, and the presence of a volume-providing edge feature of a GDT/MOV device can allow excess glass formed during a sealing process to be accommodated therein to avoid the excess glass to protrude beyond the wall of the GDT/MOV device (e.g., as a bead structure in FIG. 29). As described herein, such a volume-providing edge feature can be beneficial when the protrusion of the sealing material is to be avoided.

Accordingly, it will be understood that in some embodiments, a GDT/MOV device that utilizes any sealing material (including glass material and non-glass material that can be squeezed or flowed out during a sealing process) can benefit from the presence of a volume-providing edge feature as described herein.

In the various examples described herein, a MOV device with either or both of its electrodes having flared edge portion(s) can reduce edge failures. Examples of different types of flared edges, including the straight section flare of FIGS. 6 and 7 and the curved flare of FIGS. 8 and 9, are provided herein. For the straight section flare and curved flare configurations, a number of more specific examples are provided with dimensions that can be utilized to achieve desirable performance results.

As also described herein in reference to FIGS. 15 to 17, a MOV can be designed with a flared edge configuration to provide an edge value of a MOV parameter having a magnitude that is less than various magnitude values relative to a center value of the MOV parameter. Such a MOV parameter can be, for example, temperature, electric field strength or surface charge density. It will be understood that such a flared edge configuration can apply to the example edge geometries (e.g., straight section flare and the curved flare) described herein, but is not necessarily limited to such specific geometry examples.

Accordingly, it will be understood that a MOV device having one or more features as described herein can have a flared edge electrode configuration that is based on a selected edge flare geometry, based on selected ranges or values of edge and center MOV parameters (regardless of type and/or dimensions of the corresponding edge geometry), or some combination thereof, in view of design considerations such as device rating, material, size and application specifications.

Further, a GDT/MOV device having one or more features as described herein can be configured based on design considerations associated with GDT performance, MOV performance, or some combination thereof. For example, and referring to the example GDT/MOV devices of FIGS. 25A and 30B, it is noted that the amount of flare of an internal electrode (e.g., 414 or 417 in FIG. 25A) can impact the edge performance of the corresponding MOV. The edge flares of the internal electrodes (414 and 417 in FIG. 25A) can also impact, for example, the breakdown voltage of the GDT, since the flared edges of the electrodes are closer than the center gap dimension.

In the foregoing example, suppose that a particular edge flare configuration is desired to provide a desired MOV performance. In such a situation, the GDT design can be adjusted to accommodate the edge flare configuration while remaining within a desired GDT performance range. For example, the thickness of the seal (e.g., 513 in FIG. 25A) can be adjusted appropriately to obtain a desired minimum gap between the edges of the electrodes to provide a corresponding breakdown voltage.

In another example, the amount of flare of an internal electrode of a GDT/MOV device can be based on a desired GDT performance. In such a situation, each MOV portion can be designed to accommodate such an edge flare configuration while remaining within a desired MOV performance range. For example, MOV design considerations such a metal oxide material and/or thickness of the metal oxide layer can be adjusted appropriately for the MOV portions.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. An electrical device comprising:

a first metal oxide varistor (MOV) including a metal oxide layer having first and second sides, and first and second electrodes implemented on the first and second sides of the metal oxide layer, respectively, each electrode including a laterally inner portion and an edge portion, the edge portion of the first electrode having a flared profile; and a second MOV coupled to the first MOV with an electrically insulating seal, the second MOV including a metal oxide layer having first and second sides, and first and second electrodes implemented on the first and second sides of the metal oxide layer, respectively, each electrode including a laterally inner portion and an edge portion, the edge portion of the first electrode having a flared profile, the first and second MOVs oriented so that their first sides face each other, such that the first electrodes of the first and second MOVs form a gas discharge tube (GDT).

2. The electrical device of claim 1, wherein the electrical device is configured to provide an electrically series combination of the first MOV, the GDT and the second MOV, with the GDT including a gas enclosed in a sealed chamber formed with the electrically insulating seal.

3. The electrical device of claim 1, wherein the edge portion of the second electrode of each MOV also includes a flared profile.

4. The electrical device of claim 1, wherein the edge portion of the first electrode of each MOV includes a straight section that extends from the respective inner portion at an angle to provide the flared profile when viewed in a side sectional view.

5. The electrical device of claim 1, wherein the edge portion of the first electrode of each MOV includes a curve that extends from the respective inner portion to provide the flared profile when viewed in a side sectional view.

6. The electrical device of claim 5, wherein the curve includes a portion of a conic section curve or an exponential curve.

7. The electrical device of claim 1, wherein the second electrode of each MOV is substantially planar such that its edge portion is co-planar with the inner portion.

8. The electrical device of claim 1, wherein the first side of the metal oxide layer of each MOV is dimensioned to accommodate the respective first electrode, and the second side of the metal oxide layer of each MOV is dimensioned to accommodate the respective second electrode.

9. The electrical device of claim 8, wherein the first side of the metal oxide layer of each MOV defines a shaped depression to accommodate the flared profile of the edge portion of the respective first electrode.

10. An electrical device comprising:

a first metal oxide varistor (MOV) including a first metal oxide layer with an external side and an internal side with a first shaped depression, a first external electrode on the external side of the first metal oxide layer, and a first internal electrode covering some or all of the first shaped depression, the first internal electrode having an edge portion that flares away from the first external electrode;

a second MOV including a second metal oxide layer with an external side and an internal side with a second shaped depression, a second external electrode on the external side of the second metal oxide layer, and a second internal electrode covering some or all of the second shaped depression, the second internal electrode having an edge portion that flares away from the second external electrode; and a seal implemented between the internal side of the first metal oxide layer and the internal side of the second metal oxide layer, such that the first and second internal electrodes form a gas discharge tube (GDT).

11. The electrical device of claim 10, wherein the seal is formed from an electrically insulating material, with the GDT including a gas enclosed in a sealed chamber formed with the electrically insulating seal.

12. The electrical device of claim 11, wherein the electrically insulating material includes glass.

13. The electrical device of claim 11, wherein the electrically insulating seal is dimensioned to be at least between an outer end of the edge portion of the first internal electrode and an outer end of the edge portion of the second internal electrode.

14. The electrical device of claim 13, wherein the electrically insulating seal is further dimensioned to extend laterally inward and cover some or all of the edge portion of each of the first and second internal electrodes to thereby increase a leakage path length between the first and second internal electrodes.

15. The electrical device of claim 10, further comprising an emissive coating formed over each internal electrode.

16. The electrical device of claim 10, wherein each of the first and second metal oxide layers includes a side wall, such that the side walls of first and second metal oxide layers define a side wall of the electrical device.

17. The electrical device of claim 16, wherein each of the first and second metal oxide layers includes an outer edge on the respective internal side, such that the outer edge of each of either or both of the first and second metal oxide layers includes an edge profile dimensioned to provide a space to accommodate at least some of an excess material associated with the seal.

18. An electrical device comprising:

a first metal oxide varistor (MOV) including a metal oxide layer having a first side and a second side, and first and second electrodes implemented on the first and second sides of the metal oxide layer, respectively, each electrode including a laterally inner portion and an edge portion, at least one of the first and second electrodes configured such that a parameter associated with the first MOV at an edge of the edge portion of the respective electrode has a magnitude that is within a selected range of a magnitude of the parameter at a center of the electrode; and a second MOV coupled to the first MOV with an electrically insulating seal, the second MOV including a metal oxide layer having a first side and a second side, and first and second electrodes implemented on the first and second sides of the metal oxide layer, respectively, each electrode including a laterally inner portion and an edge portion, at least one of the first and second electrodes configured such that a parameter associated with the second MOV at an edge of the edge portion of the respective electrode has a magnitude that is within a selected range of a magnitude of the parameter at a center of the electrode, the first and second MOVs oriented so that their first sides face each other, such that the first electrodes of the first and second MOVs form a gas discharge tube (GDT).

19. The electrical device of claim 18, wherein the parameter includes a temperature, an electric field strength, or a surface charge density.

20. The electrical device of claim 18, wherein the selected range includes ±10% of the magnitude of the parameter at the center of the electrode.

* * * * *